(12) United States Patent
Wang et al.

(10) Patent No.: US 10,503,612 B1
(45) Date of Patent: Dec. 10, 2019

(54) APPLICATION MIGRATION BETWEEN ENVIRONMENTS

(71) Applicant: Rubrik, Inc., Palo Alto, CA (US)

(72) Inventors: Zhicong Wang, San Francisco, CA (US); Benjamin Meadowcroft, San Jose, CA (US); Biswaroop Palit, Mountain View, CA (US); Atanu Chakraborty, New Delhi (IN); Hardik Vohra, Mountain View, CA (US); Abhay Mitra, Bangalore Karnataka (IN); Saurabh Goyal, Bangalore Karnataka (IN); Sanjari Srivastava, Bangalore Karnataka (IN); Swapnil Agarwal, Bangalore Karnataka (IN); Rahil Shah, Mumbai (IN); Mudit Malpani, Mountain View, CA (US); Janmejay Singh, Bangalore Karnataka (IN); Ajay Arvind Bhave, Bangalore Karnataka (IN); Prateek Pandey, Santa Clara, CA (US)

(73) Assignee: Rubrik, Inc., Palo Alto, CA (US)

(*) Notice: Subject to any disclaimer, the term of this patent is extended or adjusted under 35 U.S.C. 154(b) by 0 days.

(21) Appl. No.: 16/018,013

(22) Filed: Jun. 25, 2018

(51) Int. Cl.
 G06F 11/14 (2006.01)
 G06F 9/455 (2018.01)

(52) U.S. Cl.
 CPC ...... *G06F 11/1469* (2013.01); *G06F 9/45558* (2013.01); *G06F 2009/45575* (2013.01); *G06F 2201/84* (2013.01)

(58) Field of Classification Search
 CPC ............. G06F 11/1469; G06F 9/45558; G06F 2009/45575; G06F 2201/84
 See application file for complete search history.

(56) References Cited

U.S. PATENT DOCUMENTS 6,981,114 B1 * 12/2005 Wu ................... G06F 11/1469
                                                      711/112
9,417,976 B2 * 8/2016 Sugabrahmam .... G06F 11/1471
(Continued)

OTHER PUBLICATIONS

Anderton, Chris. Creating a new EC2 AMI from within VMware or from VMDK files. Oct. 15, 2015 (retrieved on Sep. 16, 2018). Retrieved from the Internet <URL: https://thewebfellas.com/blog/creating-an-new-ec2-ami-from-within-vmware-or-from-vmdk-files>.
*

*Primary Examiner* — Paul Contino
(74) *Attorney, Agent, or Firm* — Schwegman Lundberg & Woessner, P.A.

(57) ABSTRACT

A data management and storage (DMS) cluster of peer DMS nodes manages migration of an application between a primary compute infrastructure and a secondary compute infrastructure. The secondary compute infrastructure may be a failover environment for the primary compute infrastructure. Primary snapshots of virtual machines of the application in the primary compute infrastructure are generated, and provided to the secondary compute infrastructure. During a failover, the primary snapshots are deployed in the secondary compute infrastructure as virtual machines. Secondary snapshots of the virtual machines are generated, where the secondary snapshots are incremental snapshots of the primary snapshots. In failback, the secondary snapshots are provided to the primary compute infrastructure, where they are combined with the primary snapshots into construct a current state of the application, and the application is deployed in the current state by deploying virtual machines on the primary compute infrastructure.

19 Claims, 19 Drawing Sheets

(56) References Cited

U.S. PATENT DOCUMENTS

| | | | |
|---|---|---|---|
| 10,120,764 B1* | 11/2018 | Ramachandran ... | G06F 11/1451 |
| 10,152,386 B1* | 12/2018 | Ramachandran ... | G06F 11/1451 |
| 10,185,637 B2* | 1/2019 | Deng ................. | G06F 11/2007 |
| 2002/0049778 A1* | 4/2002 | Bell .................... | G06F 11/1456 |
| 2010/0107158 A1* | 4/2010 | Chen .................. | G06F 11/1438 |
| | | | 718/1 |
| 2013/0198557 A1* | 8/2013 | Bensinger .......... | G06F 11/1451 |
| | | | 714/3 |
| 2014/0006858 A1* | 1/2014 | Helfman ............. | G06F 11/1448 |
| | | | 714/19 |
| 2014/0115706 A1* | 4/2014 | Silva .................. | H04L 63/1425 |
| | | | 726/23 |
| 2015/0261514 A1* | 9/2015 | Fu ...................... | G06F 9/45558 |
| | | | 718/1 |
| 2015/0317222 A1* | 11/2015 | Mahindru .......... | G06F 11/2023 |
| | | | 714/4.11 |
| 2015/0324260 A1* | 11/2015 | Mutalik ............. | G06F 9/45558 |
| | | | 714/703 |
| 2016/0062858 A1* | 3/2016 | Gallagher .......... | G06F 11/1484 |
| | | | 714/6.23 |
| 2016/0117163 A1* | 4/2016 | Fukui ................. | G06F 8/65 |
| | | | 717/171 |
| 2016/0239396 A1* | 8/2016 | Deng ................. | G06F 11/2007 |
| 2017/0262520 A1* | 9/2017 | Mitkar ............... | G06F 16/275 |
| 2019/0114230 A1* | 4/2019 | Ramachandran ... | G06F 11/1451 |
| 2019/0140905 A1* | 5/2019 | Vembuli ............ | H04L 41/0846 |
| 2019/0179711 A1* | 6/2019 | Luo .................... | G06F 11/1451 |
| 2019/0179918 A1* | 6/2019 | Singh ................. | G06F 9/45558 |
| 2019/0213123 A1* | 7/2019 | Agarwal ............ | G06F 12/0253 |

* cited by examiner

Service Schedule 222

| machine_user_id | machine_id | SLA |
|---|---|---|
| VM01 | m001 | standard VM |
| VM02 | m002 | standard VM |
| PM04 | m003 | standard PM |
| VM07 | m004 | high frequency |
| PM01 | m005 | short life |
| ... | | |

FIG. 3A

Job Queue 224

| job_id | start_time | job_type | job_info |
|---|---|---|---|
| 00001 | 0600 | pull snapshot | target = m001 |
| 00002 | 0600 | pull snapshot | target = m005 |
| 00003 | 0610 | replicate | target = m003 |
| 00004 | 0615 | run analytics | target = m002 |
| 00005 | 0615 | trash collection | xxx |
| ... | | | |

FIG. 3B

Image Table 228

| im_id | im_location |
|---|---|
| m001.im1 | ... |
| m001.im1-2 | |
| m001.im2-3 | |
| m001.im3-4 | |
| m001.im4-5 | |
| ... | |

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | |
| ... | | |

FIG. 3C

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | |
| ... | |
| m001.im11-12 | |

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im1, ..., m001.im4-5 |
| m001.ss6 | 20171002.0900 | ... |
| ... | | |
| m001.ss12 | 20171003.2100 | m001.im1, ..., m001.im11-12 |

FIG. 4A

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | |
| ... | |
| m001.im11-12 | |

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im1, ..., m001.im4-5 |
| m001.ss6 | 20171002.0900 | |
| ... | | |
| m001.ss12 | 20171003.2100 | m001.im1, ..., m001.im11-12 |

FIG. 4B

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im5 |
| m001.ss6 | 20171002.0900 | ... |
| ... | | |
| m001.ss12 | 20171003.2100 | m001.im5, ...<br>m001.im11-12 |

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | ... |
| ... | |
| m001.im11-12 | |
| m001.im5 | |

FIG. 4C

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2 |
| m001.ss4 | 20171001.2100 | m001.im1, m001.im1-2, m001.im2-3, m001.im3-4 |
| m001.ss5 | 20171002.0300 | m001.im5 |
| m001.ss6 | 20171002.0900 | |
| ... | | |
| m001.ss12 | 20171003.2100 | m001.im5, ...<br>m001.im11-12 |

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | |
| ... | ... |
| m001.im11-12 | |
| m001.im5 | |
| m001.im5-1 | |

FIG. 4D

Application Service Schedule 232

| application_user_id | application_id | machine_id | SLA |
|---|---|---|---|
| APP01 | a001 | m001, m002, m003 | standard application |
| APP02 | a002 | m004, m005 | short life |
| APP03 | a003 | m006, m007 | high frequency |
| APP04 | a004 | m008, m009, m001 | standard application |
| ... | | | |

FIG. 5A

Job Queue 224

| job_id | start_time | job_type | job_info | application_id |
|---|---|---|---|---|
| 00001 | 0300 | pull snapshot | target = m003 | APP01 |
| 00002 | 0300 | pull snapshot | target = m002 | APP01 |
| 00003 | 0300 | pull snapshot | target = m003 | APP01 |
| ... | | | | |
| 00010 | 0600 | pull snapshot | target = m004 | APP02 |
| 00011 | 0600 | pull snapshot | target = m005 | APP02 |
| ... | | | | |

FIG. 5B

Application Snapshot Table 236

| ss_id | ss_time | snapshot_child_list | snapshot_parent_list |
|---|---|---|---|
| app001.ss1 | 20171001.0300 | m001.ss1, m002.ss1, m003.ss1 | |
| m001.ss1 | 20171001.0300 | | app001.ss1 |
| m002.ss1 | 20171001.0300 | | app001.ss1 |
| m003.ss1 | 20171001.0300 | | app001.ss1 |
| app001.ss2 | 20171002.0300 | m001.ss2, m002.ss2, m003.ss2 | |
| m001.ss2 | 20171002.0300 | | app002.ss2 |
| m001.ss2 | 20171002.0300 | | app002.ss2 |
| m001.ss2 | 20171002.0300 | | app002.ss2 |
| ... | | | |

```
Provide snapshot of application to set of
machines
805
```
↓
```
Activate the set of machines based on
application dependency
810
```
↓
```
Configure the set of machines to
execute the application
815
```

FIG. 8

APPLICATION MIGRATION BETWEEN ENVIRONMENTS

BACKGROUND

1. Technical Field

The present invention generally relates to managing and storing data, for example for application backup purposes.

2. Background Information

The amount and type of data that is collected, analyzed and stored is increasing rapidly over time. The compute infrastructure used to handle this data is also becoming more complex, with more processing power and more portability. As a result, data management and storage is increasingly important. One aspect of this is reliable data backup and storage, and fast data recovery in cases of failure. Another aspect is data portability across locations and platforms.

At the same time, virtualization allows virtual machines to be created and decoupled from the underlying physical hardware. For example, a hypervisor running on a physical host machine or server may be used to create one or more virtual machines that may each run the same or different operating systems, applications and corresponding data. In these cases, management of the compute infrastructure typically includes backup and retrieval of the virtual machines, in addition to just the application data. However, various different platforms are offered for virtualization, including VMware, Microsoft Hyper-V, Microsoft Azure, GCP (Google Cloud Platform), Nutanix AHV, Linux KVM (Kernel-based Virtual Machine), and Xen. While users may desire to have their applications and data be machine-agnostic, it typically is not easy to port applications and data between different platforms.

Thus, there is a need for better approaches to managing and storing data, particularly across different virtual machine platforms.

SUMMARY

A data management and storage (DMS) cluster of peer DMS nodes manages migration of an application between a primary compute infrastructure and a secondary compute infrastructure. The secondary compute infrastructure may be a failover environment for the primary compute infrastructure. The DMS cluster includes a distributed data store implemented across the peer DMS nodes. Primary snapshots of virtual machines of the application in the primary compute infrastructure are generated, and transferred to the secondary compute infrastructure. The primary snapshot may be converted to a form suitable for deployment as virtual machines in the secondary compute infrastructure. The primary snapshots are deployed on the secondary compute infrastructure as virtual machines, such as responsive to a failure in the primary compute infrastructure that causes a failover to the secondary compute infrastructure. Secondary snapshots of the second virtual machines are generated. The secondary snapshots may be incremental snapshots of the primary snapshots. In a failback, the secondary snapshots are provided to the primary compute infrastructure, where they are combined with the primary snapshots to construct a current state of the application. The application is deployed on the primary compute infrastructure in the current state by deploying virtual machines on the primary compute infrastructure using the primary and secondary snapshots.

Some embodiments include a system for failover and failback of an application between a primary compute infrastructure and a secondary compute infrastructure. The system includes a DMS cluster and a primary compute infrastructure. The DMS cluster includes peer DMS nodes that autonomously service the primary compute infrastructure. Each of the peer DMS nodes are configured to generate primary snapshots of virtual machines of the application in the primary compute infrastructure, and transfer the primary snapshots to a secondary compute infrastructure for failover. The primary snapshots may be transferred in form suitable for deployment as virtual machines in the primary compute infrastructure. For failback, the primary compute infrastructure is configured to: receive secondary snapshots of the virtual machines of the application in the secondary compute infrastructure, where the secondary snapshots are generated during the failover from the primary compute infrastructure to the secondary compute infrastructure. The secondary snapshots may be in a form suitable for deployment as virtual machines in the primary compute infrastructure. The primary compute infrastructure is further configured to: construct a current state of the application by combining the primary snapshots generated before the failover and the secondary snapshots generated during the failover; and deploy the application in the current state by deploying virtual machines on the primary compute infrastructure.

Some embodiments include a non-transitory computer-readable medium comprising instructions that when executed by a processor configures the processor to: generate primary snapshots of virtual machines of an application in a primary compute infrastructure; transfer the primary snapshots to a secondary compute infrastructure in a form suitable for deployment as virtual machines in the secondary compute infrastructure; receive secondary snapshots of the virtual machines of the application in the secondary compute infrastructure in a form suitable for deployment as virtual machines in the primary compute infrastructure, the secondary snapshots being generated during a failover from the primary compute infrastructure to the secondary compute infrastructure; and to initiate a failback from the secondary compute infrastructure to the primary compute infrastructure: construct a current state of the application by combining the primary snapshots generated before the failover and the secondary snapshots generated during the failover; and deploy the application in the current state by deploying virtual machines on the primary compute infrastructure.

Other aspects include components, devices, systems, improvements, methods, processes, applications, computer readable mediums, and other technologies related to any of the above.

BRIEF DESCRIPTION OF THE DRAWINGS

FIGS. 3A-C are DMS tables that illustrate operation of the system of FIGS. 1-2, according to one embodiment.

FIGS. 4A-4D are DMS tables that illustrate updating of snapshot images, according to one embodiment.

FIGS. 5A-5C are DMS tables that illustrate operation of the system of FIGS. 1-2 to manage and store data for an application, according to one embodiment.

FIG. 8 is a flow chart of a process for recovering an application to a compute infrastructure, according to one embodiment.

DETAILED DESCRIPTION

Figure 1:
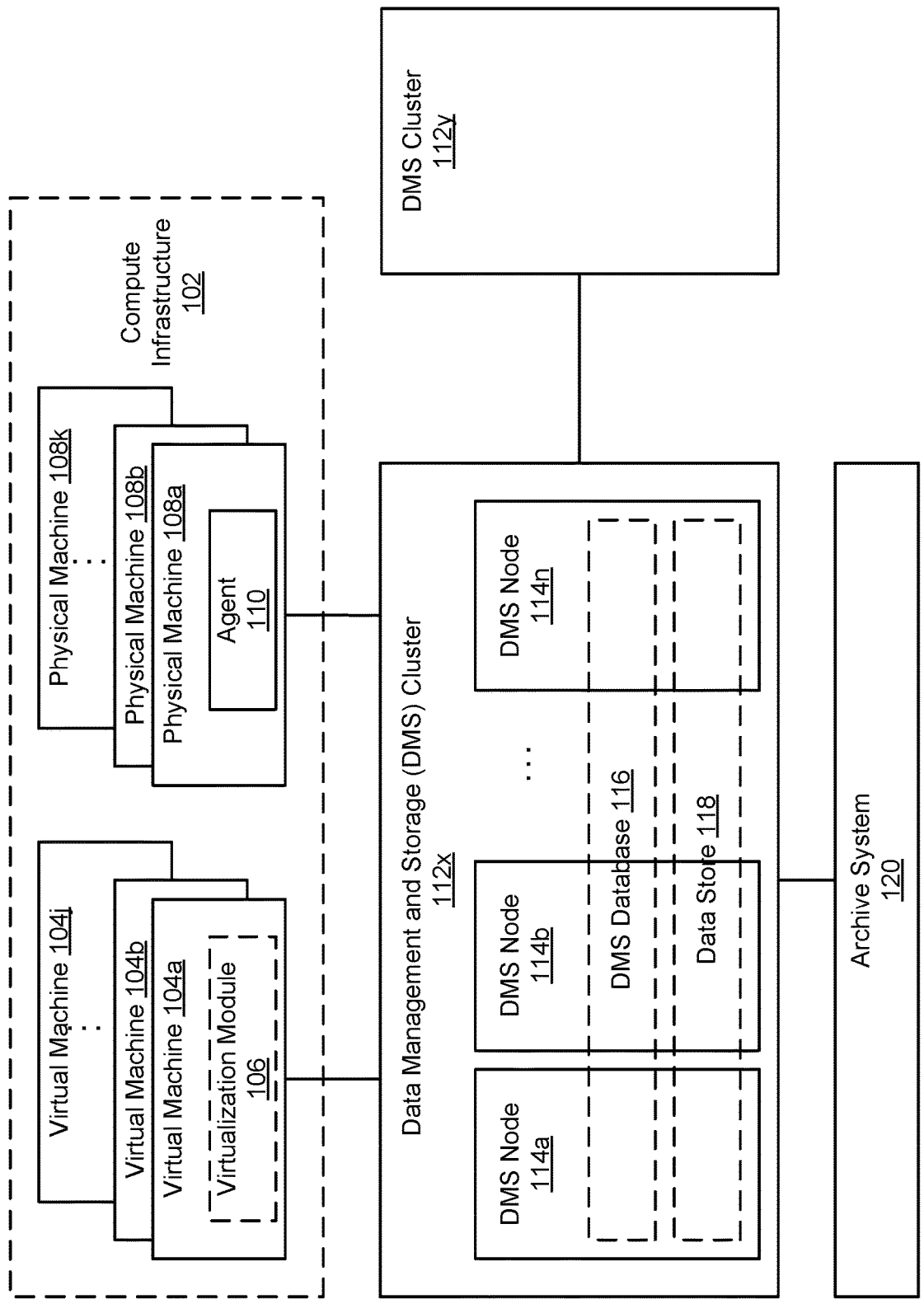
FIG. 1 is a block diagram of a system for managing and storing data, according to one embodiment.

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

A data management and storage (DMS) cluster of peer DMS nodes manages failover and failback of application(s) between a primary compute infrastructure and a secondary compute infrastructure. The primary compute infrastructure may be a production environment and the secondary compute infrastructure may be a remote cloud computing environment used primarily for backup purposes. The application(s) may execute on virtual machines such as database servers, file servers, and web servers. The DMS cluster generates incremental snapshots of the virtual machines executing on the primary compute infrastructure. For convenience, these snapshots will be referred to as primary snapshots, where "primary" indicates only that the snapshots originate from the primary compute infrastructure. The DMS cluster may store the primary snapshots, and may also transfer the primary snapshots to the secondary compute infrastructure in a form appropriate for the secondary compute infrastructure.

Responsive to a failure in the primary compute environment, a failover process is performed where the primary snapshots on the secondary compute infrastructure are deployed as virtual machines on the secondary compute infrastructure, with the secondary compute infrastructure now serving as the production environment. During this failover mode, a DMS cluster for the secondary compute infrastructure generates incremental snapshots of the virtual machines executing on the secondary compute infrastructure. For convenience, these will be referred to as secondary snapshots, where "secondary" indicates only that these snapshots originate from the secondary compute infrastructure. The secondary snapshots are also transferred to the primary compute infrastructure in an appropriate form.

Responsive to a resolution of the failure in the primary compute infrastructure, a failback process is performed to return the production environment to the primary compute infrastructure. The primary snapshots before failover are combined with the secondary snapshots during failover to recreate the current state of the production environment, which is deployed on the primary compute infrastructure. The virtual machines in the secondary compute infrastructure may be shut down, and the DMS cluster may resume generating primary snapshots of the virtual machines on the primary compute infrastructure.

Among other advantages, the application(s) may be migrated across different types of computing environments for failover and failback operations. Furthermore, using incremental snapshots reduces the network traffic for data transfer between the primary and secondary computing infrastructures. It also avoids having to recreate the production environment from scratch during failback and avoids the use of check sum processing to validate the recreated environment, because of the known relationship between the primary snapshots, secondary snapshots and current state of the production environment.

In more detail, FIG. 1 is a block diagram illustrating a system for managing and storing data, according to one embodiment. The system includes a data management and storage (DMS) cluster 112$x$, a secondary DMS cluster 112$y$ and an archive system 120. The DMS system provides data management and storage services to a compute infrastructure 102, which may be used by an enterprise such as a corporation, university, or government agency. Many different types of compute infrastructures 102 are possible. Some examples include serving web pages, implementing e-commerce services and marketplaces, and providing compute resources for an enterprise's internal use. The compute infrastructure can include production environments, in addition to development or other environments.

In this example, the compute infrastructure 102 includes both virtual machines (VMs) 104$a$-$j$ and physical machines (PMs) 108$a$-$k$. The VMs 104 can be based on different protocols. VMware, Microsoft Hyper-V, Microsoft Azure, GCP (Google Cloud Platform), Nutanix AHV, Linux KVM (Kernel-based Virtual Machine), and Xen are some examples. The physical machines 108$a$-$n$ can also use different operating systems running various applications. Microsoft Windows running Microsoft SQL or Oracle databases, and Linux running web servers are some examples.

The DMS cluster 112 manages and stores data for the compute infrastructure 102. This can include the states of machines 104, 108, configuration settings of machines 104, 108, network configuration of machines 104, 108, and data stored on machines 104, 108. Example DMS services includes backup, recovery, replication, archival, and analytics services. The primary DMS cluster 112$x$ enables recovery of backup data. Derivative workloads (e.g., testing, development, and analytic workloads) may also use the DMS cluster 112$x$ as a primary storage platform to read and/or modify past versions of data.

In this example, to provide redundancy, two DMS clusters 112$x$-$y$ are used. From time to time, data stored on DMS cluster 112$x$ is replicated to DMS cluster 112$y$. If DMS cluster 112$x$ fails, the DMS cluster 112$y$ can be used to provide DMS services to the compute infrastructure 102 with minimal interruption.

Archive system 120 archives data for the computer infrastructure 102. The archive system 120 may be a cloud service. The archive system 120 receives data to be archived from the DMS clusters 112. The archived storage typically is "cold storage," meaning that more time can be spent to retrieve data stored in archive system 120. In contrast, the DMS clusters 112 provide faster data retrieval, such as for backup recovery.

The following examples illustrate operation of the DMS cluster 112 for backup and recovery of VMs 104. This is used as an example to facilitate the description. The same principles apply also to PMs 108 and to other DMS services.

Each DMS cluster 112 includes multiple peer DMS nodes 114a-n that operate autonomously to collectively provide the DMS services, including managing and storing data. A DMS node 114 includes a software stack, processor and data storage. DMS nodes 114 can be implemented as physical machines and/or as virtual machines. The DMS nodes 114 are interconnected with each other, for example, via cable, fiber, backplane, and/or network switch. The end user does not interact separately with each DMS node 114, but interacts with the DMS nodes 114a-n collectively as one entity, namely, the DMS cluster 112.

The DMS nodes 114 are peers and preferably each DMS node 114 includes the same functionality. The DMS cluster 112 automatically configures the DMS nodes 114 as new nodes are added or existing nodes are dropped or fail. For example, the DMS cluster 112 automatically discovers new nodes. In this way, the computing power and storage capacity of the DMS cluster 112 is scalable by adding more nodes 114.

The DMS cluster 112 includes a DMS database 116 and a data store 118. The DMS database 116 stores data structures used in providing the DMS services, as will be described in more detail in FIG. 2. In the following examples, these are shown as tables but other data structures could also be used. The data store 118 contains the backup data from the compute infrastructure 102, for example snapshots of VMs or application files. Both the DMS database 116 and the data store 118 are distributed across the nodes 114, for example using Apache Cassandra. That is, the DMS database 116 in its entirety is not stored at any one DMS node 114. Rather, each DMS node 114 stores a portion of the DMS database 116 but can access the entire DMS database. Data in the DMS database 116 preferably is replicated over multiple DMS nodes 114 to increase the fault tolerance and throughput, to optimize resource allocation, and/or to reduce response time. In one approach, each piece of data is stored on at least three different DMS nodes. The data store 118 has a similar structure, although data in the data store may or may not be stored redundantly. Accordingly, if any DMS node 114 fails, the full DMS database 116 and the full functionality of the DMS cluster 112 will still be available from the remaining DMS nodes. As a result, the DMS services can still be provided.

Considering each of the other components shown in FIG. 1, a virtual machine (VM) 104 is a software simulation of a computing system. The virtual machines 104 each provide a virtualized infrastructure that allows execution of operating systems as well as software applications such as a database application or a web server. A virtualization module 106 resides on a physical host (i.e., a physical computing system) (not shown), and creates and manages the virtual machines 104. The virtualization module 106 facilitates backups of virtual machines along with other virtual machine related tasks, such as cloning virtual machines, creating new virtual machines, monitoring the state of virtual machines, and moving virtual machines between physical hosts for load balancing purposes. In addition, the virtualization module 106 provides an interface for other computing devices to interface with the virtualized infrastructure. In the following example, the virtualization module 106 is assumed to have the capability to take snapshots of the VMs 104. An agent could also be installed to facilitate DMS services for the virtual machines 104.

A physical machine 108 is a physical computing system that allows execution of operating systems as well as software applications such as a database application or a web server. In the following example, an agent 110 is installed on the physical machines 108 to facilitate DMS services for the physical machines.

The components shown in FIG. 1 also include storage devices, which for example can be a hard disk drive (HDD), a magnetic tape drive, a solid-state drive (SSD), or a disk array (e.g., a storage area network (SAN) storage device, or a networked-attached storage (NAS) device). A storage device can be separate from or integrated with a physical machine.

The components in FIG. 1 are interconnected with each other via networks, although many different types of networks could be used. In some cases, the relevant network uses standard communications technologies and/or protocols and can include the Internet, local area networks, and other types of private or public networks. The components can also be connected using custom and/or dedicated data communications technologies.

Figure 2:
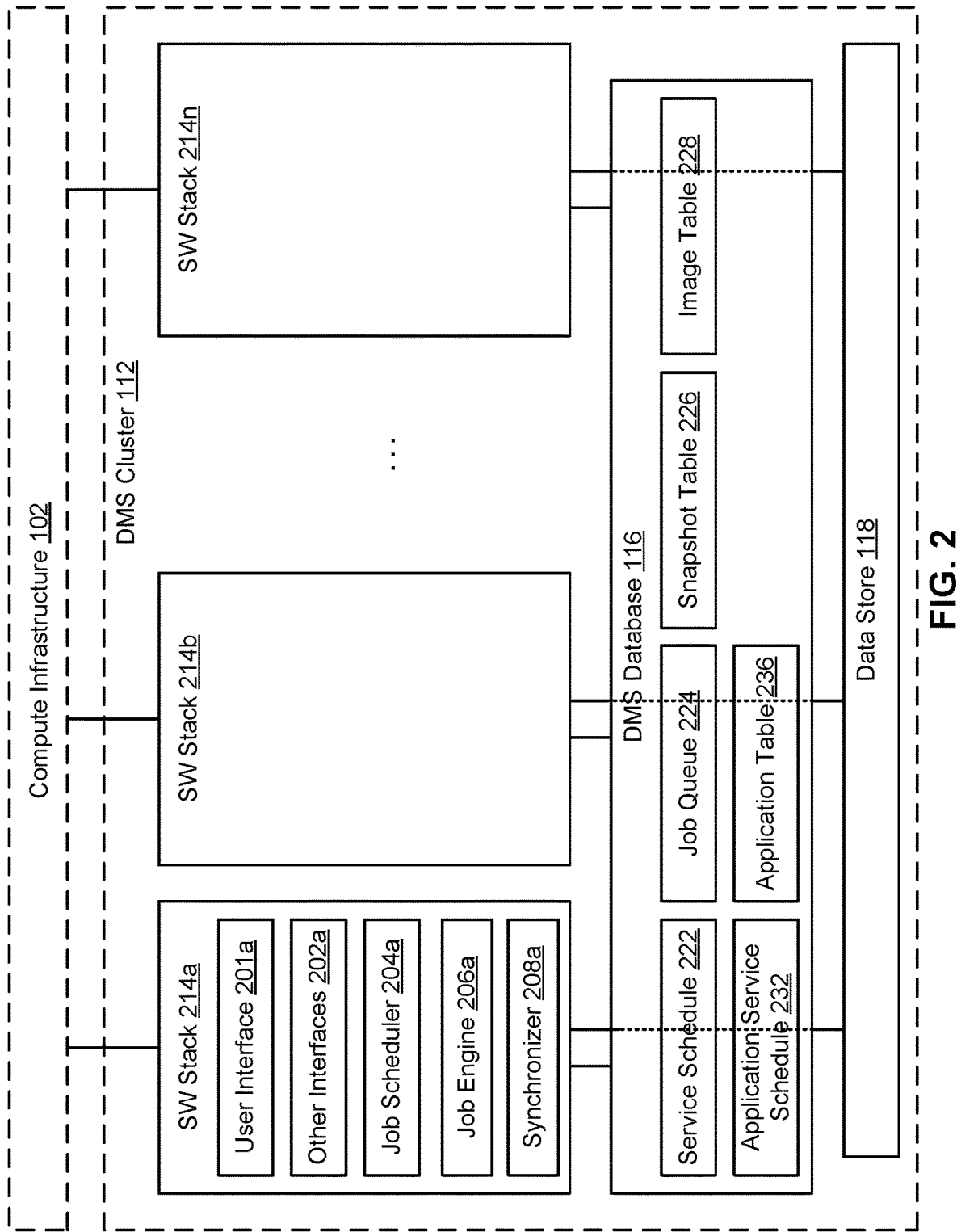
FIG. 2 is a logical block diagram of a data management and storage (DMS) cluster, according to one embodiment.

FIG. 2 is a logical block diagram illustrating an example DMS cluster 112, according to one embodiment. This logical view shows the software stack 214a-n for each of the DMS nodes 114a-n of FIG. 1. Also shown are the DMS database 116 and data store 118, which are distributed across the DMS nodes 114a-n. Preferably, the software stack 214 for each DMS node 114 is the same. This stack 214a is shown only for node 114a in FIG. 2. The stack 214a includes a user interface 201a, other interfaces 202a, job scheduler 204a and job engine 206a. This stack is replicated on each of the software stacks 214b-n for the other DMS nodes. The DMS database 116 includes the following data structures: a service schedule 222, a job queue 224, a snapshot table 226 and an image table 228. In the following examples, these are shown as tables but other data structures could also be used.

The user interface 201 allows users to interact with the DMS cluster 112. Preferably, each of the DMS nodes includes a user interface 201, and any of the user interfaces can be used to access the DMS cluster 112. This way, if one DMS node fails, any of the other nodes can still provide a user interface. The user interface 201 can be used to define what services should be performed at what time for which machines in the compute infrastructure (e.g., the frequency of backup for each machine in the compute infrastructure). In FIG. 2, this information is stored in the service schedule 222. The user interface 201 can also be used to allow the user to run diagnostics, generate reports or calculate analytics. In some embodiments, the user interface 201 provides for definition of a set of machines as an application. The DMS cluster 112 may perform synchronized DMS services for the set of machines of the application. Information defining services for applications may be stored in the application service schedule 232. In some embodiments, the application service schedule 232 is integrated with the service schedule 222. The set of machines of the application may include virtual machines, 104, physical machines 108, or combinations of virtual machines 104 and physical machines 108.

The software stack 214 also includes other interfaces 202. For example, there is an interface 202 to the computer infrastructure 102, through which the DMS nodes 114 may make requests to the virtualization module 106 and/or the agent 110. In one implementation, the VM 104 can communicate with a DMS node 114 using a distributed file system protocol (e.g., Network File System (NFS) Version 3) via the virtualization module 106. The distributed file system protocol allows the VM 104 to access, read, write, or modify files stored on the DMS node 114 as if the files were locally stored on the physical machine supporting the VM 104. The distributed file system protocol also allows the VM 104 to mount a directory or a portion of a file system located within the DMS node 114. There are also interfaces to the DMS database 116 and the data store 118, as well as network interfaces such as to the secondary DMS cluster 112y and to the archive system 120.

The job schedulers 204 create jobs to be processed by the job engines 206. These jobs are posted to the job queue 224. Examples of jobs are pull snapshot (take a snapshot of a machine), replicate (to the secondary DMS cluster), archive, etc. In some embodiments, a set of job may be associated with an application, and performed synchronously. For example, snapshots may be generated for the set of machines associated with the application to generate a snapshot of the application. Some of these jobs are determined according to the service schedule 222, or the application service schedule 232. For example, if a certain machine is to be backed up every 6 hours, then a job scheduler will post a "pull snapshot" job into the job queue 224 at the appropriate 6-hour intervals. Other jobs, such as internal trash collection or updating of incremental backups, are generated according to the DMS cluster's operation separate from the service schedule 222 or application service schedule 232.

The job schedulers 204 preferably are decentralized and execute without a master. The overall job scheduling function for the DMS cluster 112 is executed by the multiple job schedulers 204 running on different DMS nodes. Preferably, each job scheduler 204 can contribute to the overall job queue 224 and no one job scheduler 204 is responsible for the entire queue. The job schedulers 204 may include a fault tolerant capability, in which jobs affected by node failures are recovered and rescheduled for re-execution. In some embodiments, a job scheduler 204 performs a scheduling function to cause the DMS cluster 112 to perform a synchronized DMS service for multiple machines associated with an application.

The job engines 206 process the jobs in the job queue 224. When a DMS node is ready for a new job, it pulls a job from the job queue 224, which is then executed by the job engine 206. Preferably, the job engines 206 all have access to the entire job queue 224 and operate autonomously. Thus, a job scheduler 204j from one node might post a job, which is then pulled from the queue and executed by a job engine 206k from a different node.

The synchronizer 208 performs a synchronization function for DMS services for multiple machines associated with an application. In particular, the synchronizer 208 may communicate with job engines 206 to ensure that each job associated with the application is ready for execution prior to authorizing execution of the jobs. As such, the job engines 206 allocated to the DMS service for the multiple machines can execute synchronously to generate a snapshot of the application at a particular time.

In some cases, a specific job is assigned to or has preference for a particular DMS node (or group of nodes) to execute. For example, if a snapshot for a VM is stored in the section of the data store 118 implemented on a particular node 114x, then it may be advantageous for the job engine 206x on that node to pull the next snapshot of the VM if that process includes comparing the two snapshots. As another example, if the previous snapshot is stored redundantly on three different nodes, then the preference may be for any of those three nodes.

The snapshot table 226 and image table 228 are data structures that index the snapshots captured by the DMS cluster 112. In this example, snapshots are decomposed into images, which are stored in the data store 118. The snapshot table 226 describes which images make up each snapshot. For example, the snapshot of machine x taken at time y can be constructed from the images a,b,c. The image table is an index of images to their location in the data store 118. For example, image a is stored at location aaa of the data store 118, image b is stored at location bbb, etc.

The application table 236 is a data structure that indexes the application snapshots captured by the DMS cluster 112. An application snapshot may include a set of snapshots of individual machines. Each of the snapshots associated with the application may also be referenced in the snapshot table 226. In some embodiments, the application table 236 is integrated with the snapshot table 226. More details of example implementations are provided in FIGS. 3, 4, and 5 below.

DMS database 116 also stores metadata information for the data in the data store 118. The metadata information may include file names, file sizes, permissions for files, and various times such as when the file was created or last modified.

FIGS. 3, 4, and 5 illustrate operation of the DMS system shown in FIGS. 1-2. FIGS. 3 and 4 illustrate management of individual machines of the computer infrastructure, while FIG. 5 illustrates management at a higher application level. FIG. 3A is an example of a service schedule 222. The service schedule defines which services should be performed on what machines at what time. It can be set up by the user via the user interface, automatically generated, or even populated through a discovery process. In this example, each row of the service schedule 222 defines the services for a particular machine. The machine is identified by machine_user_id, which is the ID of the machine in the compute infrastructure. It points to the location of the machine in the user space, so that the DMS cluster can find the machine in the compute infrastructure. In this example, there is a mix of virtual machines (VMxx) and physical machines (PMxx). The machines are also identified by machine_id, which is a unique ID used internally by the DM cluster.

The services to be performed are defined in the SLA (service level agreement) column. Here, the different SLAs are identified by text: standard VM is standard service for virtual machines. Each SLA includes a set of DMS policies (e.g., a backup policy, a replication policy, or an archival policy) that define the services for that SLA. For example, "standard VM" might include the following policies:

Backup policy: The following backups must be available on the primary DMS cluster 112x: every 6 hours for the prior 2 days, every 1 day for the prior 30 days, every 1 month for the prior 12 months.

Replication policy: The backups on the primary DMS cluster for the prior 7 days must also be replicated on the secondary DMS cluster 112y.

Archive policy: Backups that are more than 30 days old may be moved to the archive system 120.

The underlines indicate quantities that are most likely to vary in defining different levels of service. For example, "high frequency" service may include more frequent backups than standard. For "short life" service, backups are not kept for as long as standard.

From the service schedule 222, the job schedulers 204 populate the job queue 224. FIG. 3B is an example of a job queue 224. Each row is a separate job. job_id identifies a job and start_time is the scheduled start time for the job.

job_type defines the job to be performed and job_info includes additional information for the job. Job 00001 is a job to "pull snapshot" (i.e., take backup) of machine m001. Job 00003 is a job to replicate the backup for machine m003 to the secondary DMS cluster. Job 00004 runs analytics on the backup for machine m002. Job 00005 is an internal trash collection job. The jobs in queue 224 are accessible by any of the job engines 206, although some may be assigned or preferred to specific DMS nodes.

FIG. 3C are examples of a snapshot table 226 and image table 228, illustrating a series of backups for a machine m001. Each row of the snapshot table is a different snapshot and each row of the image table is a different image. The snapshot is whatever is being backed up at that point in time. In the nomenclature of FIG. 3C, m001.ss1 is a snapshot of machine m001 taken at time t1. In the suffix ".ss1", the .ss indicates this is a snapshot and the 1 indicates the time t1. m001.ss2 is a snapshot of machine m001 taken at time t2, and so on. Images are what is saved in the data store 118. For example, the snapshot m001.ss2 taken at time t2 may not be saved as a full backup. Rather, it may be composed of a full backup of snapshot m001.ss1 taken at time t1 plus the incremental difference between the snapshots at times t1 and t2. The full backup of snapshot m001.ss1 is denoted as m001.im1, where ".im" indicates this is an image and "1" indicates this is a full image of the snapshot at time t1. The incremental difference is m001.im1-2 where "1-2" indicates this is an incremental image of the difference between snapshot m001.ss1 and snapshot m001.ss2.

In this example, the service schedule indicates that machine m001 should be backed up once every 6 hours. These backups occur at 3 am, 9 am, 3 pm and 9 pm of each day. The first backup occurs on Oct. 1, 2017 at 3 am (time t1) and creates the top rows in the snapshot table 226 and image table 228. In the snapshot table 226, the ss_id is the snapshot ID which is m001.ss1. The ss_time is a timestamp of the snapshot, which is Oct. 1, 2017 at 3 am. im_list is the list of images used to compose the snapshot. Because this is the first snapshot taken, a full image of the snapshot is saved (m001.im1). The image table 228 shows where this image is saved in the data store 118.

On Oct. 1, 2017 at 9 am (time t2), a second backup of machine m001 is made. This results in the second row of the snapshot table for snapshot m001_ss2. The image list of this snapshot is m001.im1 and m001.im1-2. That is, the snapshot m001_ss2 is composed of the base full image m001.im1 combined with the incremental image m001.im1-2. The new incremental image m001.im1-2 is stored in data store 118, with a corresponding entry in the image table 228. This process continues every 6 hours as additional snapshots are made.

For virtual machines, pulling a snapshot for the VM typically includes the following steps: freezing the VM and taking a snapshot of the VM, transferring the snapshot (or the incremental differences) and releasing the VM. For example, the DMS cluster may receive a virtual disk file that includes the snapshot of the VM. The backup process may also include deduplication, compression/decompression and/or encryption/decryption.

From time to time, these tables and the corresponding data are updated as various snapshots and images are no longer needed or can be consolidated. FIGS. 4A-4D show an example of this. FIG. 4A shows the snapshot table and image table after backups have been taken for 3 days using the process described in FIG. 3. However, if the service schedule requires 6-hour backups only for the past 2 days, then the 6-hour backups for the first day October 1 are no longer needed. The snapshot m001.ss1 is still needed because the service schedule requires daily backups, but snapshots .ss2, .ss3 and .ss4 can be deleted and are removed from the snapshot table, as indicated by the cross-hatching in FIG. 4B. However, the incremental images .im1-2, .im2-3 and .im3-4 are still required to build the remaining snapshots.

In FIG. 4C, the base image is updated from .im1 to .im5. That is, a full image of snapshot 5 is created from the existing images. This is a new row at the bottom of the image table 228. The im_list for snapshots .ss5 to .ss12 are also updated to stem from this new base image .im5. As a result, the incremental images .im1-2, .im2-3, .im3-4 and .im4-5 are no longer required and they can be deleted from the data store and from the image table 228. However, the data store now contains two full images: .im1 and .im5. Full images are usually much larger than incremental images. This redundancy can be addressed by creating a backwards incremental image .im5-1, shown in FIG. 4D as a new row in the image table 228. With the addition of this backwards incremental image, the full image .im1 is no longer needed.

FIGS. 4A-4D illustrate backup at an individual machine level. FIGS. 5A-5C illustrate backup at an application-level. An application may be implemented across multiple machines. As a result, it is desirable that all of the component machines are backed up approximately at the same time. FIG. 5A is an example of an application service schedule 232. Typically, this service schedule is in addition to the machine-level service schedule of FIG. 3A. The application service schedule 232 defines which services for applications, each defined by a set of machines, should be performed and at what time. Each row of the application service schedule 232 defines the services for a particular application. The application is identified by application_user_id, which is the ID of the application in the compute infrastructure, and by application_id, which is the ID of the application used internally by the DM cluster. The machines of each application may be identified by the machine_id, which is the unique ID used internally by the DM cluster. Furthermore, the services to be performed for each application is defined by the SLA column of the application service schedule 232. In some embodiments, each application may have a single SLA shared with the set of machines of the application. However, the SLAs for machines within an application may vary.

Application APP01 is an application including machines m001, m002, m003, and a "standard application" SLA. Application APP02 includes machines m004, m005, and a "short life" SLA. Application APP03 includes machines m006, m007, and a "high frequency" SLA. Application APP04 includes machines m008, m009, and m001, and a "standard application" SLA. An application SLA may include a collection of SLAs for a set of machines. The SLAs for each machine may be the same or different. In some embodiments, each machine_id is associated with an SLA as shown in the service schedule 222. An application may include two or more machines, and the machines may include virtual machines, physical machines, or combinations of virtual machines and physical machines. Furthermore, two or more applications may share a machine.

FIG. 5B is an example of the job queue 224 of FIG. 3B, but modified to include synchronized jobs for applications. Like the job queue 224 in FIG. 3B, each row is a separate job identified by job_id. Furthermore, the job queue 224 may include an application_id column or other identifier to indicate that the job is associated with an application. Jobs 00001 through 00003 are jobs associated with the application APP01. These jobs may share a common job_type, as well as a common start_time such that the jobs associated with the application are synchronized. Jobs 00010 through 00011 are jobs associated with the application APP02, and also share the same start_time and job_type. In some embodiments, the jobs of an application may include different job_types. Job_info includes additional information for the job, such as the machine_id for the job. Jobs may be added to the jobs queue 224 based on the service schedule 222, the application service schedule 232, or both.

FIG. 5C is an example of an application snapshot table 236, illustrating backups for an application. The rows in the application table indicate the relations between application snapshots and the individual machine snapshots that form the application snapshots. The nomenclature for snapshots discussed above for the snapshot table 226 may be applicable to the application table 236. For example, app001.ss1 is a snapshot of an application app001 taken at time t1. Furthermore, snapshots m001.ss1, m002.ss1, and m003.ss1 are snapshots of machines m001, m003, and m003 associated with the application taken at the time t1. The ss_time is a timestamp of the snapshots, which should be the same time or close in time for each of the snapshots associated with the application. Furthermore, snapshot_child_list defines for each application the set of machines associated with the application. Snapshot_parent_list defines for each machine the application to which the machine belongs. App001.ss2 is a snapshot of the application taken at a time t2. Snapshots m001.ss2, m002.ss2, and m003.ss2 are snapshots of machines m001, m003, and m003 associated with the application taken at the time t2.

The snapshots of the machines may be full snapshots or incremental snapshots, as may be defined in the snapshot table 226 of FIG. 3C. In some embodiments, each machine-level snapshot associated with an application may be defined with reference to a snapshot table 226 and image table 228, as shown in FIG. 3C. In some embodiments, the application snapshot table 236 is integrated with the snapshot table 226. For example, the application snapshot table 236 may include an im_list to define images of the snapshots associated the application. In some embodiments, the application table 236 lists only application snapshots with references to snapshots of individual machines stored in the snapshot table 226.

The description above is just one example. The various data structures may be defined in other ways and may contain additional or different information.

In some embodiments, the DMS clusters 112 provide DMS services for a set of machines, such as VMs 104 and/or PMs 108, which implement an application. The DMS services may include backup, recovery, replication, archival, and analytics services. For example, an application may include one or more database servers, file servers, and web servers distributed across multiple machines. The DMS clusters 112 performs synchronized data fetch jobs for the set of machines in the application.

Figure 6:
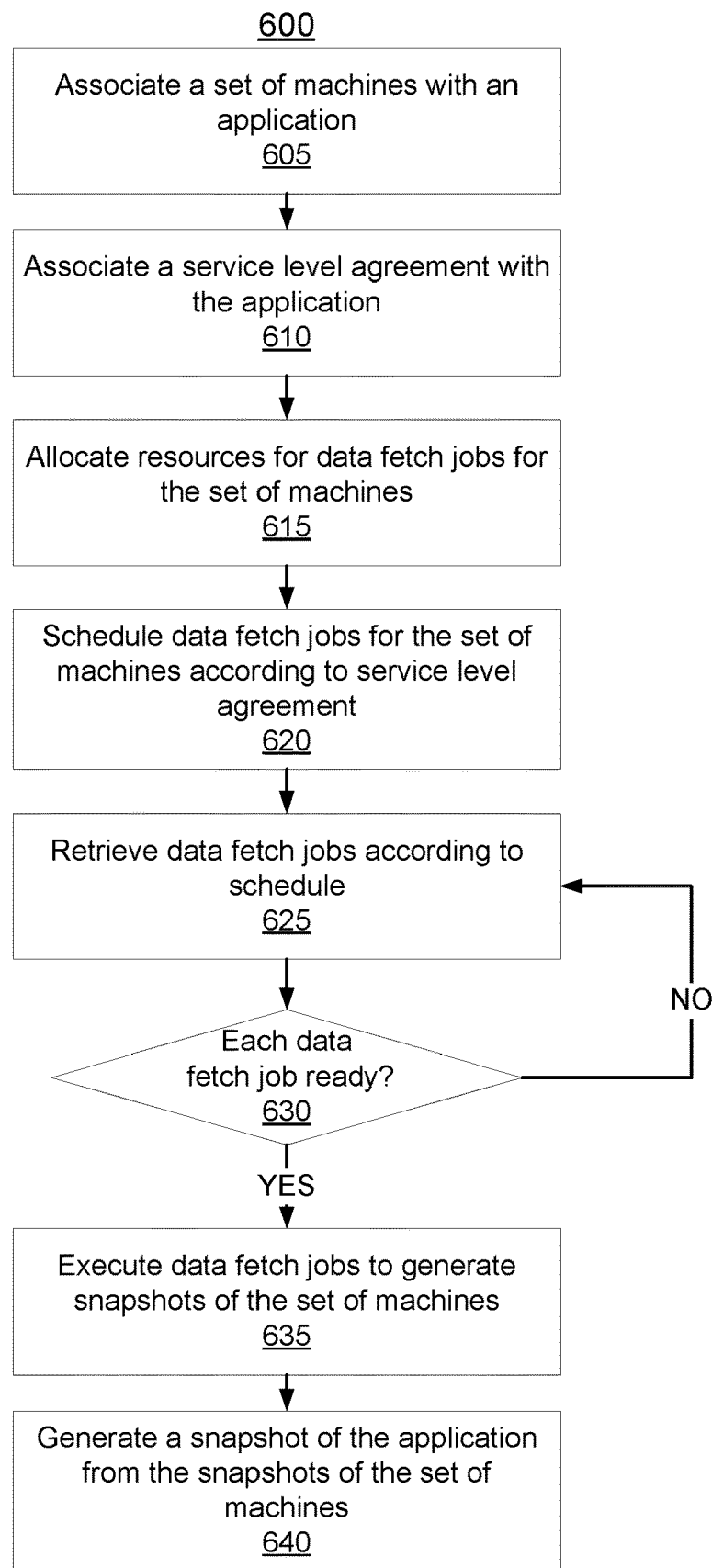
FIG. 6 is a flow chart of a process for managing data for an application, according to one embodiment.

FIG. 6 is a flow chart of a process 600 for generating a snapshot of an application, according to one embodiment. The snapshot of the application refers to synchronized snapshots of multiple machines associated with the application. The process 600 is discussed as being performed by DMS cluster 112, although other types of computing structures may be used. In some embodiments, the process 600 may include different and/or additional steps, or some steps may be in different orders.

A DMS cluster 112 (e.g., the job scheduler 204*a* of a DMS node 114*a*) associates 605 a set of machines with an application. For example, a user of the compute infrastructure 102 may access the DMS cluster 112 via user interface 201 to define the machines associated with the application in the compute infrastructure 102. Furthermore, the user interface 201 may be used to define what services should be performed at what time for the machines associated with the application.

In some embodiments, the job scheduler 204*a* stores the association between the set of machines with the application using an application service schedule 232. For example, the application service schedule 232 may store in each row an application as identified by application_id, multiple machines associated with the application as identified by machine_user_id and/or machine_id, and the SLA(s) associated with the multiple machines. As discussed above, the machine_user_id refers to the ID of the machine in the compute infrastructure 102, while the machine_id referes to a unique ID used internally by the DM cluster 112.

The DMS cluster 112 (e.g., the job scheduler 204*a*) associates 610 one or more SLAs associated with the application. The services to be performed on each of the machines of the application are defined in the SLA. In some embodiments, the same SLA is associated with each of the set of machines of the application. In other embodiments, different machines may be associated with different SLAs, such as different backup (or "data fetch"), replication, or archive policies. In some embodiments, each of the machines may share the same backup policy in terms of frequency to synchronize the backup of the application, but include different replication or archive policies. In some embodiments, the job scheduler 204*a* stores the SLA in association with the application within a row of the service schedule 232.

The DMS cluster 112 (e.g., the job scheduler 204*a*) allocates 615 processing and storage resources for data fetch jobs for the set of machines. For example, the job scheduler 204*a* may perform an automated discovery operation to determine the machines, files, etc. of the application, and uses this information to determine the amount of processing and storage resources needed for allocation to the job. To perform multiple data fetch jobs for the machines of the application at the same or substantially the same time, the job scheduler 204*a* may allocate a minimal amount of the processing resources of the DNS nodes 114 and the storage resources of the data store 118. In some embodiments, the job scheduler 204*a* may define or update the size of the DMS cluster 112 by associating multiple DMS nodes 114 needed to perform the jobs with the DMS cluster 112. The amount of resources allocated may vary, for example, based on the number of machines of the application, the amount of data to be transferred, or the amount of DMS nodes 114 authorized for a user or compute infrastructure 102.

The DMS cluster 112 (e.g., the job scheduler 204*a*) schedules 620 the data fetch jobs for the set of machines according to the SLA. For example, the job scheduler 204*a* populates the job queue 224 with data fetch jobs for the machines of the application according to the application service schedule 232. Each data fetch job for a machine may be a separate row in the job queue 224. Each job may be identified by the job_id, and may be associated with a start_time defining the scheduled start time for the job. The type of job may be defined by job_type, which for a data fetch job may be specified as "pull snapshot." Additional information regarding each job may be defined by job_info, such as the machine_id of the machine. In some embodiments, each job may further be associated with the application as defined by application_id in the jobs queue 224. The application_id indicates the application associated with job, and multiple job_ids may be associated with the same application_id to indicate a job belongs to an application and thus should be synchronized with other jobs of the application that share the application_id in the jobs queue 224.

The DMS cluster 112 (e.g., the job engine 206 of one or more DMS nodes 114 of the DMS cluster 112) retrieves the data fetch jobs according to the schedule. For example, the job engine 206 of multiple DMS nodes 114 may monitor the jobs queue 224, and retrieve the jobs associated with the application from the job queue for execution at the defined start time. In some embodiments, each job engine 206 may retrieve one of the jobs defined in a row of the job queue. In some embodiments, each DMS node 114 allocates processing and memory resources needed to execute the job. If resources are unavailable, the DMS node 114 may determine that its retrieved job fails to be ready for execution.

The DMS cluster 112 (e.g., a synchronizer 208a of the DMS node 114a) determines 630 whether each of the data fetch jobs associated with the application is ready for execution. The data fetch jobs may be determined as ready for execution when each of the jobs associated with the application has been retrieved by a job engine 206 from the jobs queue 224, or when the jobs engines 206 is otherwise ready to execute the data fetch jobs (e.g., in parallel, at the defined start time). In some embodiments, each job engine 206 of multiple DMS nodes 114 that has retrieved a job associated with the application or is otherwise ready to execute the job sends a message to the synchronizer 208a. The synchronizer 208a may determine that a message has been received for each of the jobs associated with the application, and may send a message to each of the job engines 206 that enables job execution. In some embodiments, the synchronizer 208a may monitor the jobs queue 224 to determine each of the jobs associated with the application have been retrieved from the jobs queue 224, and then enables the job execution when each of the jobs associated with the application have been retrieved from the jobs queue 224.

In response to determining that at least one of the data fetch jobs fail to be ready for execution, the DMS cluster 112 (e.g., the job engines 206) retrieves 625 remaining data fetch jobs. In some embodiments, the synchronizer 208a may delay execution of the data fetch jobs until each of the data fetch jobs is ready for execution. The synchronizer 208a may wait until a message has been received for each of the jobs associated with the application before enabling each of the job engines 206 to execute their job. In some embodiments, the synchronizer 208a may allocate additional resources, such as an additional DMS node 114, for a scheduled job that has caused delay in the parallel job execution.

In response to determining that each of the data fetch jobs is ready for execution, the DMS cluster 112 (e.g., the job engines 206 of multiple DMS nodes 114) executes 635 the data fetch jobs to generate snapshots of the set of machines. The job engines 206 of multiple DMS nodes 114 may generate the snapshots of the machines of the application in parallel (e.g., as defined by the shared start time for the jobs) by capturing data from the compute infrastructure 102 to generate a synchronous snapshot of the application. Each job engine 206 may freeze a machine and take the snapshot of the machine, transferring the snapshot (or the incremental differences), and release the machine. As the needed resources for each of the fetch jobs has been allocated, and each of the job engines 206 has retrieved a respective job of the application for execution, the snapshots of the machines are synchronized. Furthermore, the reliability of the jobs is increased.

The DMS cluster 112 (e.g., the job engines 206) generates 640 a snapshot of the application from the snapshots of the set of machines. The snapshots of the set machines may include full images, incremental images, or combinations of full and incremental images. Furthermore, the snapshot of the application including the snapshots of the set of machines in a distributed data store, such as the data store 118. In some embodiments, the DMS cluster 112 generates the snapshot of the application by associating the snapshots of the set of machines with the application in an application snapshot table 236. Furthermore, each snapshot and its corresponding image(s) may be defined in the snapshot table 226 and the image table 228.

Although the process 600 is discussed with respect to data fetch jobs, other types of synchronized jobs for multiple machines may be performed using the process 600. As discussed above, the DMS cluster 112 is not limited to backup or data fetch jobs, and may also provide other DMS services including recovery, replication, trash collection, archival, and analytics services. Furthermore, the process 600 may be repeated to generate multiple snapshots of the application. Jobs for each snapshot of the application may be placed in the jobs queue 224 and retrieved by DMS nodes to execute the jobs. Each of the DMS nodes 114 may be "peers," and the DMS services for particular machines may be processed by different DMS nodes 114 of the DMS cluster 112 (e.g., for different application snapshots). In some embodiments, the process 600 may be performed to provide synchronized DMS services for other groups of machines other than machines for an application.

Figure 7:
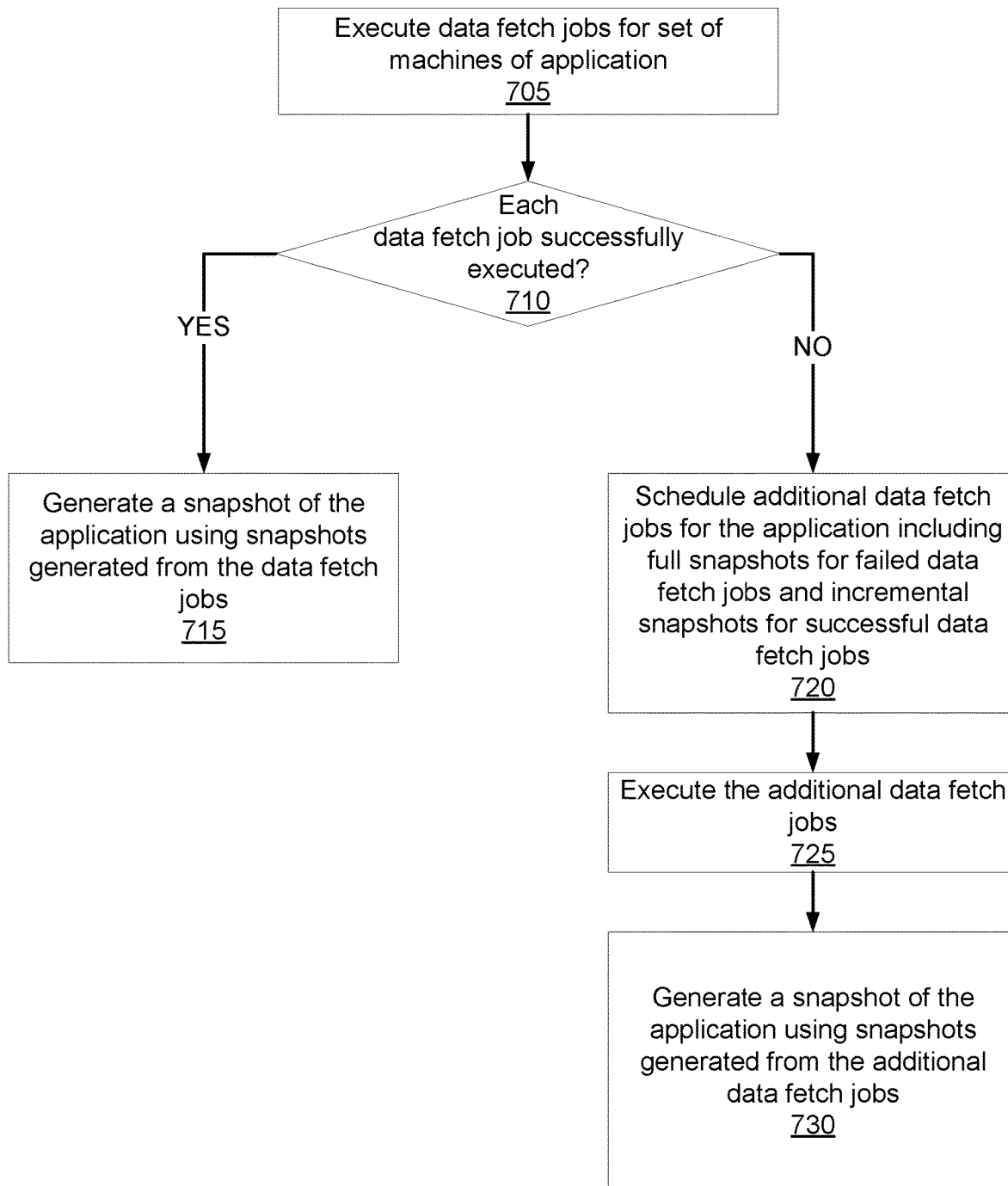
FIG. 7 is a flow chart of a process for generating a snapshot of an application using full and incremental snapshots, according to one embodiment.

FIG. 7 is a flow chart of a process 700 for generating a snapshot of an application, according to one embodiment. The process 700 may include performing additional data fetch jobs for an application when at least one of the data fetch jobs fail to successfully execute. In the additional data fetch jobs, a synchronized snapshot of the application is generated using incremental snapshots for machines associated with previously successfully data fetch jobs, and full snapshots for machines associated with previously failed data fetch. The process 700 is discussed as being performed by DMS cluster 112, although other types of computing structures may be used. In some embodiments, the process 700 may include different and/or additional steps, or some steps may be in different orders.

The DMS cluster 112 (e.g., the job engines 206) executes 705 data fetch jobs associated with an application. The discussion at 635 of the process 600 may be applicable at 705.

The DMS cluster 112 (e.g., the job scheduler 204a or the synchronizer 208a) determines 710 whether each of the data fetch jobs of the application has successfully executed. A data fetch job for the application may be determined as successfully executed when a snapshot of each of the set of machines associated with the application has been successfully generated. These data fetch jobs may include captures of full snapshots (e.g., when no prior full snapshot exists, or when a full capture is otherwise desired) or incremental snapshots. However, one or more of the snapshots may fail for various reasons. For example, the freezing machine operation to prepare a machine for snapshot capture may fail, or a hardware or software of the DMS cluster 112 may fail, or a network connection between the DMS cluster 112 and the compute infrastructure 102 may fail. In other examples, the cluster 112 may have too much input/output operations per second (IOPS) demand on it, resulting in high production workload, or a quality of service (QoS) action failed.

In response to determining that each of the jobs of the application has successfully executed, the DMS cluster 112 generates 715 a snapshot of the application using the snapshots of the set of machines generated from the data fetch jobs. For example, the DMS cluster 112 associates the snapshots of the set of machines with the application by updating an application snapshot table 236. These snapshots, which may include full or incremental snapshots of the set of machines, are incorporated with the snapshot of the application for the defined time (e.g., as specified by start time in the job queue 224).

In response to determining that a data fetch job of the application has failed to successfully execute, the DMS cluster 112 (e.g., the job scheduler 204a or the synchronizer 208a) schedules 720 additional data fetch jobs for the application including a full snapshot for machines associated with the data fetch jobs that failed and incremental snapshots for other machines associated with the data fetch jobs that succeeded in the execution at step 705.

The DMS cluster 112 (e.g., job engine 206 of one or more DMS nodes 114 of the DMS cluster 112) executes 725 the additional data fetch jobs. The discussion for generating a snapshot of the application discussed above in connection with the process 600 may be applicable at 720 and 720. For example, the synchronizer 208a may ensure that all data fetch jobs of the application have been retrieved by DMS nodes 114. Execution of the additional data fetch jobs, if successful, results in the full snapshots for the machines associated with the data fetch jobs that previously failed and incremental snapshots for the machines associated with the data fetch jobs that previously succeeded.

The DMS cluster 112 (e.g., job engine 206 of one or more DMS nodes 114) generates 730 the snapshot of the application using snapshots generated from the additional data fetch jobs. For example, the DMS cluster 112 associates the snapshots generated from the additional data fetch jobs with the application by updating an application snapshot table 236. The snapshot of the application is generated using full snapshots for the machines associated the data fetch jobs that previously failed, the full snapshots for the other machines associated with the data fetch jobs that previously succeeded, and the incremental snapshots for the other machines associated with the data fetch jobs that previously succeeded. The snapshot for the machines associated with data fetch jobs that previously succeeded may each include the (e.g., full or incremental) snapshot previously captured combined with the incremental snapshot captured in the additional data fetch jobs. The snapshot for the machines associated with data fetch jobs that previously failed each include the full snapshot captured in the additional data fetch jobs. As such, a synchronized snapshot of the application may be generated for each of set of machines of the application using the additional data fetch jobs.

In some embodiments, rather than capturing a full snapshots for each machine associated with a data fetch job that previously failed, the DMS cluster 112 may generate an incremental snapshot based on a prior successful full snapshot, or a prior successful incremental snapshot. Furthermore, the various operations associated with incremental snapshots discussed herein may be performed on the snapshots of the set of machines that form the snapshot of the application, such as so long as the snapshots of the machines remains synchronized. The operations on the snapshots may include consolidating multiple incremental snapshots, deleting unneeded snapshots or incremental snapshots, etc.

The process 700 may be repeated. For example, if the current synchronized data fetch job for the application results in one or more failed data fetch job executions, then the process 700 may be repeated to perform a subsequent synchronized data fetch job where the DMS cluster 112 captures a full snapshot for the failed data fetch jobs in the current synchronized data fetch job, and incremental snapshots of the successful data fetch jobs in the current synchronized data fetch job.

FIG. 8 is a flow chart of a process 800 for recovering an application to a compute infrastructure, according to one embodiment. The process 800 is discussed as being performed by DMS cluster 112, although other types of computing structures may be used. In some embodiments, the process 800 may include different and/or additional steps, or some steps may be in different orders.

The DMS cluster 112 (e.g., job engine 206 of one or more DMS nodes 114) provides 805 a snapshot of an application to a set of machines. The set of machines may be same machines of the compute infrastructure 102 from which the snapshots of the machines were captured, or may be different machines. In some embodiments, the application includes database servers, file servers, web servers, or other types of servers located across the set of machines. Each machine may contain one or more servers. In some embodiments, providing the snapshot of the application is performed by placing jobs including a "recovery" job_type in the jobs queue for processing by peer DMS nodes 114 of the DMS cluster 112. The discussion regarding scheduling and executing the data fetch task in the process 600 may be applicable to the recovery job. In some embodiments, the app snapshot is provided to the set of machines based on a predefined recovery priority. The predefined recovery may be defined by a user or programmatically (e.g., based on known dependencies).

The DMS cluster 112 may provide the snapshot of the application to the compute infrastructure 102 from the data store 118 of the DMS cluster 112, the data store 118 of another DMS cluster 112, or a data store of the archive system 120, or some other location where the snapshots of the set of machines may be stored. In some embodiments, a single DMS cluster 112 may provide the snapshot of the application to the set of machines. However, additional DMS clusters 112 may be used (e.g., in parallel) to increase the speed of the recovery job.

The set of machines are activated 810 based on application dependency. For example, the web servers may depend on the file servers, and the file servers may depend on the database servers. As such, the machines including database servers may be activated first, the machines including file servers activated second, and the machines including web server activated third. The application dependency and types of servers may vary. In some embodiments, the application dependency may be stored in the DMS database 116 as metadata information, or some other location in the DMS cluster 112.

The set of machines are configured 815 to execute the application. For example, Internet Protocol (IP) addresses and other networking information may be assigned to each of the machines. In another example, a machine may execute a script to change content within the machine.

Application Failover and Failback

Figure 9:
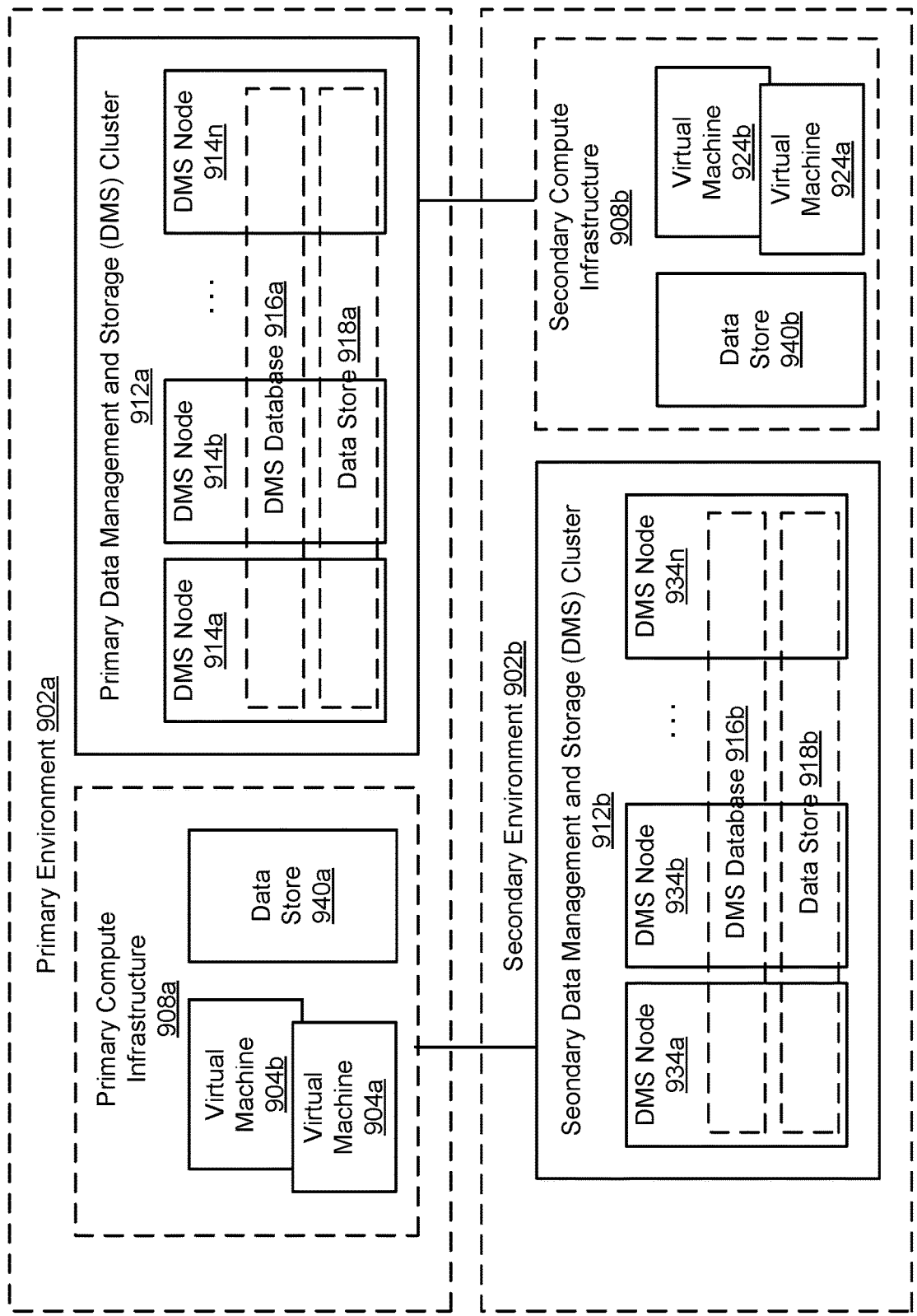
FIG. 9 is a block diagram illustrating a system for managing failover and failback for an application, according to one embodiment.

Incremental snapshots of virtual machines may be used to facilitate failover and failback processes for application migration between a primary environment and a secondary environment. Failover includes a process of executing a recovery plan configuration (e.g., IP configurations, resource mapping, etc.) and powering on snapshots of an application on the secondary environment, such as a designated recovery site. Failback includes reversing direction of the failover back to the primary environment. The primary and secondary environments may be different types of environments using different native formats for virtual machines. Here, snapshots generated in each environment are converted to formats suitable for the other environment to facilitate the failover and failback. FIG. 9 is a block diagram illustrating a system for managing failover and failback for an application, according to one embodiment. The system includes a primary environment 902a and a secondary environment 902b. The primary environment 902a includes a primary compute infrastructure 908a and a primary DMS cluster 912a. The primary DMS cluster 912a includes DMS nodes 914a through 914n. The secondary environment 902b includes a secondary compute infrastructure 908b and a secondary DMS cluster 912b. The secondary DMS cluster 912b includes DMS nodes 934a through 934n. Although a single DMS cluster is shown for each of the primary environment 902a and secondary environment 902b, the environments 902a and 902b may each include multiple DMS clusters. In some embodiments, the primary DMS cluster 912a and the secondary DMS cluster 912b are connected DMS Clusters, or are the same DMS cluster. In some embodiments, the secondary environment 902a is integrated with the archive system 120.

The primary environment 902a may be a production environment and the secondary environment 902b may be a failover environment. In some embodiments, the primary environment 902a is an on-premise environment and the secondary environment 902b is a cloud computing environment remote from the on-premise environment. In another example, the primary environment 902a and the secondary environment 902b are both cloud computing environments. In some embodiments, the primary environment 902a is a different type of computing environment from the secondary environment 902b. For example, the virtual machines or snapshots that are native to each environment may use different file formats.

The virtual machines 904 of the primary compute infrastructure 908a execute an application while the primary DMS cluster 912a provides DMS services to the primary compute infrastructure 908a. As discussed above in the process 600 of FIG. 6, the primary DMS cluster 912a may generate a snapshot of the virtual machines 904. A snapshot of a virtual machine 904 of the primary environment 902a is referred to herein as a "primary snapshot." The primary snapshot may include a full snapshot of each of the virtual machines 904, and any incremental snapshots of the full snapshots. The primary DMS cluster 912a may generate the primary snapshots according to an SLA of a service schedule 222 or application service schedule 232 of the DMS database 918a. The primary DMS cluster 912a further stores the primary snapshots in the data store 918a. The primary snapshots may also be stored in the data store 940 of the primary compute infrastructure 908a.

The primary DMS cluster 912a is coupled to the secondary compute infrastructure 908b. The primary DMS cluster 912a provides the primary snapshots of the virtual machines 904 to the secondary compute infrastructure 908b. The secondary compute infrastructure 908b stores the primary snapshots received from the primary environment 902a. Here, the secondary compute infrastructure 908b operates as a replication or archive storage location for the primary snapshots.

The secondary compute infrastructure 908b includes a data store 940b and virtual machines 924. The data store 940b receives the primary snapshots of the virtual machines 904 from the DMS cluster 912a, and stores the primary snapshots. Responsive to a failure of the primary compute infrastructure 908, the secondary environment 902b executes a failover process where the primary snapshots stored in the data store 940b are deployed as virtual machines 924. Each virtual machine 904 corresponds with a virtual machine 924. The primary snapshots may include a full snapshot of the virtual machines 904, and any incremental snapshots of the full snapshots. The virtual machines 924 execute the application while the virtual machines 904 of the primary compute infrastructure 908a are inactive. The secondary compute infrastructure 908b provides a failover environment for the primary compute infrastructure 908a. For testing purposes, the primary and secondary compute infrastructures 908 may execute the application in parallel.

In some embodiments, the primary snapshots of the virtual machines 904 stored in the data store 940b are converted into a format suitable for deployment in the secondary compute infrastructure 908. For example, the primary snapshots of the virtual machine 904 may be in a Virtual Machine Disk (VMDK) format when captured by the primary DMS cluster 912a, and may be converted into an Amazon Machine Image (AMI) format when the secondary compute infrastructure 908b is an Amazon Web Service (AWS) cloud computing infrastructure. The format conversion may include conversion of full or incremental primary snapshots, and results in the primary snapshots being stored in a native format of the secondary compute infrastructure 908b. In some embodiments, the primary snapshots are captured in a native format of the primary compute infrastructure 908a. The data in the AMI format may be deployed as virtual machines 924 within Elastic Compute Cloud ("EC2") instances with Elastic Block Store (EBS) volumes. The VMDK and AMI formats are only examples, and other types of formats and conversions for migration between the primary and secondary environments may be used.

When the virtual machines 924 of the secondary environment 902b execute the application, the secondary DMS cluster 912 may generate "secondary snapshots" of the virtual machines 924 in the secondary environment 902b. A secondary snapshot, as used herein, refers to a snapshot of a virtual machine of the secondary environment 902b. In some embodiments, each secondary snapshot of a virtual machine 924 is an incremental snapshot of one or more primary snapshot of a corresponding virtual machine 904. For example, the secondary DMS cluster 912b generates incremental snapshots of the virtual machines 924 based on the SLA of a service schedule 222 or application service schedule 232 stored in the DMS database 918b of the secondary DMS cluster 902b. The SLA stored in the DMS database 916b may define the same policies as the SLA stored in the DMS database 916a to retain the same DMS policies in the failover environment as the primary environment. The secondary DMS cluster 912b stores the secondary snapshots in the DMS database 916b.

In some embodiments, the secondary snapshots are generated in a native format of the secondary compute infrastructure 908b, and converted to the format of the primary snapshots. For example, the secondary snapshots may be snapshots of EBS volumes of the secondary compute infrastructure 908b that are converted into the VMDK format of the primary compute infrastructure 908a.

The secondary DMS cluster 912b provides the secondary snapshots of the virtual machines 924 to the data store 940a of the primary compute infrastructure 908a. To that end, the secondary DMS cluster 912b is coupled to the primary compute infrastructure 908a, such as via a network including the Internet. The secondary snapshots of each virtual machine 924 are stored as incremental snapshots of the primary snapshots of a corresponding virtual machine 904 to provide a snapshot for each virtual machine 904. Here, a snapshot of a virtual machine includes at least one primary snapshot and at least one incremental secondary snapshot. By combining primary and secondary snapshots, the integrated snapshot reflects the state of the application prior to failover combined with modifications to the application from execution in the secondary environment 902b prior to failback. In some embodiments, the secondary snapshots may be stored in the data store 918a of the primary DMS cluster 912a, which may provide the secondary snapshots to the data store 940a.

Responsive to restoration of the primary compute infrastructure 908 or in response to user input, the failback process is initiated where the snapshots are deployed as the virtual machine 904 of the primary compute infrastructure 908a. The virtual machines 924b of the secondary compute infrastructure 908b may be powered down. Furthermore, the primary DMS cluster 912a may continue to generate primary snapshots of the virtual machines 904a according to the SLA stored in the DMS database 916a.

Figure 10:
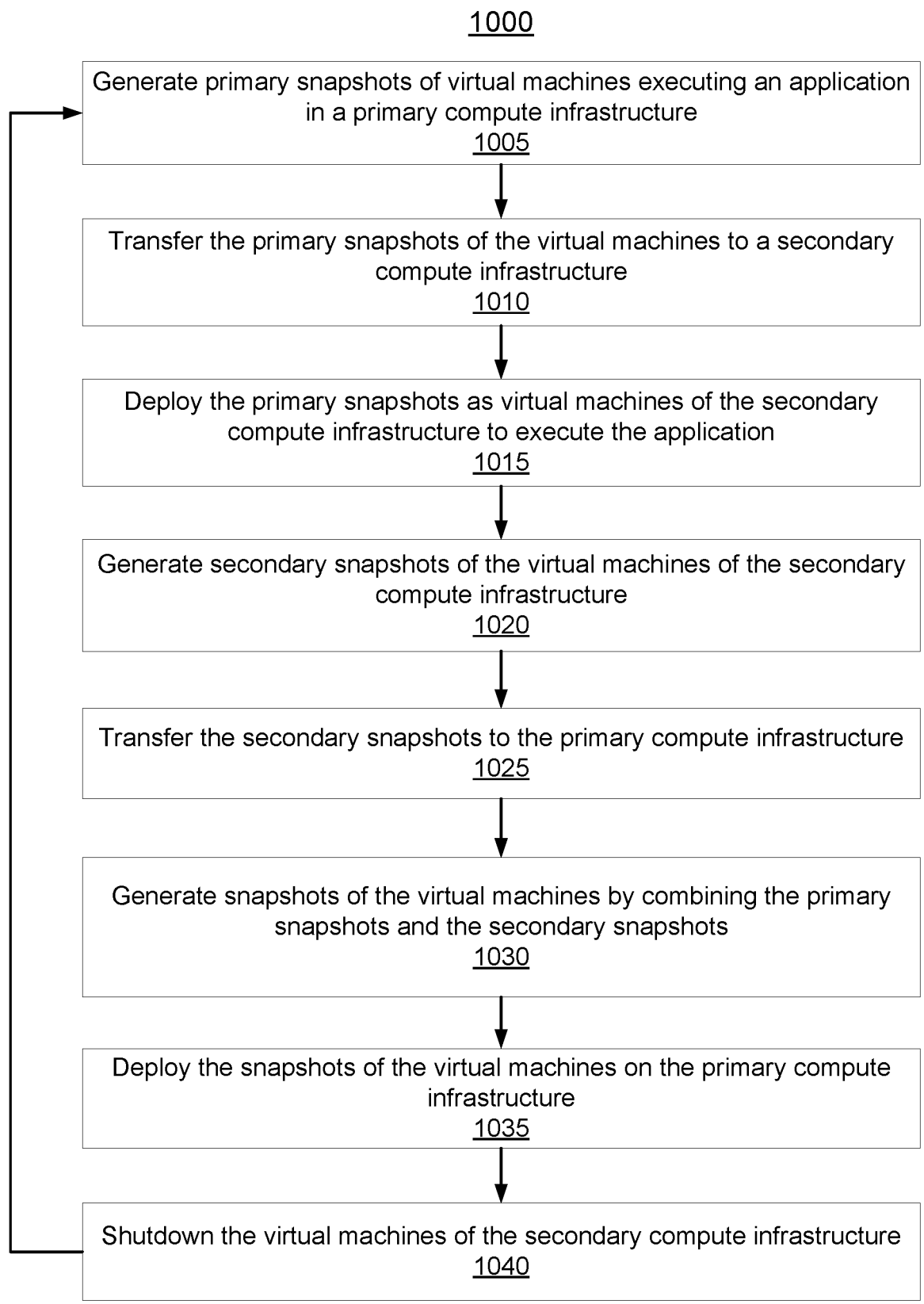
FIG. 10 is a flow chart of a process for failover and failback of an application between a primary compute infrastructure and a secondary compute infrastructure, according to one embodiment.

FIG. 10 is a flow chart of a process 1000 for failover and failback of an application between a primary compute infrastructure and a secondary compute infrastructure, according to one embodiment. The process 1000 is discussed as being performed by the primary environment 902a and secondary environment 902b, although other types of computing structures may be used. In some embodiments, the process 1000 may include different and/or additional steps, or some steps may be in different orders.

A primary DMS cluster 912a generates 1005 primary snapshots of virtual machines 904 executing an application in a primary compute infrastructure 908a. The primary snapshots may include full snapshots and/or incremental snapshots of the virtual machines 904. For example, a full snapshot may be generated for each virtual machine 904, and then subsequent snapshots may be incremental snapshots of the full snapshot. The virtual machines 904 may include a set of virtual machines of an application including database, file, and web servers. The primary DMS cluster 912a may generate the primary snapshots according to an SLA. The SLA may include backup and replication policies, and may be used to populate a service schedule 222 or application service schedule 232.

The primary DMS cluster 912a transfers 1010 the primary snapshots of the virtual machines 904 to a secondary compute infrastructure 908b. In some embodiments, the primary environment 902a and secondary environment 90b are connected via a network including the Internet. The primary snapshots may be provided to the data store 940b of the secondary compute infrastructure 908b. In some embodiments, the primary snapshots of the virtual machines 904 are generated in a native format of the primary compute infrastructure 908a, converted to a native format of the secondary compute infrastructure 908b, and stored in the secondary compute infrastructure 908b in the native format of the secondary compute infrastructure 908b. The native format of the secondary compute infrastructure 908b allows the primary snapshots to be deployed in the secondary compute infrastructure 908b. For example, the primary snapshots may be transferred to the secondary compute infrastructure 908b in a form suitable for deployment as virtual machines in the secondary compute infrastructure.

The primary snapshots of the virtual machines 904 of the primary compute infrastructure 908b are deployed 1015 as virtual machines 924 of the secondary compute infrastructure 908b to execute the application. For example, a failover may be initiated where the primary snapshots are deployed in the secondary compute infrastructure 908b responsive to a failure in the primary compute infrastructure 908b, a user input (e.g., for a test), or some other reason. The most recent primary snapshot of each virtual machine 904 prior to the failure may be used to deploy the virtual machines 924. Deployment of the virtual machines 924 to the secondary environment 902b results in the application being executed in the secondary environment 902b. The secondary environment 902b thus provides a failover environment for the application.

In some embodiments, the deployment of the virtual machines 924 based on secondary snapshots may be performed using the process 800 shown in FIG. 8. For example, the secondary snapshots may be activated based on application dependency, and then further configured as needed (e.g., resource mapping and network configuration, virtual machine configuration, inventory location, etc.) to execute the application in the secondary compute infrastructure 908b.

In some embodiments, the secondary compute infrastructure 908b is a cloud computing infrastructure, such as AWS. Here, the secondary snapshots may be in the AMI format such that they may be deployed as virtual machines within EC2 instances with EBS volumes. The format of the secondary snapshot and the type of cloud computing infrastructure of the secondary compute infrastructure 908b may vary.

The failure in the primary compute infrastructure 908a may include a planned failover, a data recovery test, or an unplanned failover. In the planned failover, datacenter downtime (e.g., maintenance) is known. In the data recovery test, a demonstration of failover without failback is performed. Here, the primary compute infrastructure 908a continues to execute the application. The secondary compute infrastructure 908b may also execute the application to demonstrate capability of executing the application on a recovery site. The secondary compute infrastructure 908b may execute the application for a designated time period, such as according to compliance and regulations. Subsequent to the testing, the secondary compute infrastructure 908b may perform a cleanup of resources provisioned during the test, and may generate a data recovery report for the test.

In the unplanned failover, the primary environment 902a is affected by an actual failure. The failure may include a failure in the primary compute infrastructure 908a and the primary DMS cluster 912a (e.g., a complete loss for the primary environment 902a), a failure in the primary compute infrastructure 908a but not the primary DMS cluster 912a, or a failure from an interruption in the primary compute infrastructure 908a.

A secondary DMS cluster 912b generates 1020 secondary snapshots of the virtual machines 924 while the virtual machines 924 are executing the application. In some embodiments, the SLA used to generate the primary snapshots in the primary environment 902a is used in the secondary environment 902b. For example, the primary DMS cluster 912a may share the SLA for the virtual machines of the application with the secondary DMS cluster 912b. In another example, the secondary snapshots may use a different SLA or other policy.

In some embodiments, the secondary snapshot of a virtual machine 924 is an incremental snapshot of one or more primary snapshots of a virtual machine 904. The secondary snapshots may be captured in the native format of the secondary compute infrastructure 908b, and converted into a native format of the primary compute infrastructure 908a.

To generate incremental snapshots, the secondary DMS cluster 912b may track the difference in between the last snapshot taken of the virtual machine in the primary environment 902a and the snapshot of the virtual machine in the secondary environment 902b. Snapshots taken in the primary and secondary environments may be linked and tracked so that the history of snapshots is contiguous.

The secondary DMS cluster 912b transfers 1025 the secondary snapshots of the virtual machines 924 to the primary compute infrastructure 908a. For example, the secondary DMS cluster 902b may be coupled to the primary compute infrastructure 908a, such as via a network including the Internet. The secondary snapshots may be incremental snapshots having smaller data size than full snapshots, thus reducing the size of data that needs to be transmitted from the secondary environment 902a to the primary environment 902b. The secondary snapshots may be transferred in a form suitable for deployment as virtual machines in the primary compute infrastructure 908a.

The primary compute infrastructure 908a generates 1030 snapshots of the virtual machines 904 by combining the primary snapshots of the virtual machines 904 with the secondary snapshots of the virtual machines 924. To initiate the failback from the secondary compute infrastructure 908b to the primary compute infrastructure 908a, a current state of the application is reconstructed by combining the primary snapshots generated before the failover and the secondary snapshots generated during the failover.

The primary snapshots of a virtual machine 904 includes a full snapshot of the virtual machine 904, and may include one or more incremental snapshots of the virtual machine 904. The secondary snapshots may include one or more incremental snapshots of the virtual machine 924 that are incremental to the primary snapshot. As such, the snapshot of a virtual machine 904 includes the state of the virtual machine in the primary environment 902a prior to failover combined with changes to the state during failover in the secondary environment 902b. The snapshots may be stored in the data store 940a for deployment. The known relationship between primary and secondary snapshots allows the virtual machines 924 to be deployed to the primary compute infrastructure 908a using virtual machine (VM) linking, and without requiring check sum comparisons between images captured from the primary compute infrastructure 908a and the secondary compute infrastructure 908b. Check-sum refers a bit validation between snapshots, whereas VM linking refers to tracking the VM's state. VM linking may be performed even though machine_id or machine_user_id may be different. For example, the VM01's snapshots are replicated, and another VM that has the history of VM01 is dynamically generated as VM01'. Even though the new snapshot is VM01' (because the actual VM01 is powered down), the snapshot history of VM01' is linked to VM01. Thus, the snapshot for VM01' may be used with incremental snapshots of VM01.

The snapshots of the virtual machines 904 are deployed 1035 on the primary compute infrastructure 908b to execute the application. For example, snapshots may be deployed responsive to the failure of the primary compute infrastructure 908a being resolved, in response to user input, or some other reason. Deploying the snapshot results in deployment of the application in the current state. The primary environment 902a thus provides a failback environment for the application subsequent to the failover to the secondary environment 902b. In some embodiments, the deployment of the virtual machines 904 based on snapshots may be performed using the process 800 shown in FIG. 8. For example, the snapshots of a set of virtual machines 904 of the application may be activated based on application dependency, and then further configured as needed (e.g., resource mapping and network configuration, virtual machine configuration, inventory location, etc.) to execute the application in the primary compute infrastructure 908a.

The failback process may vary based on the type of failure in the primary compute infrastructure 908a. For failure in the primary compute infrastructure 908a and the primary DMS cluster 912a, the secondary DMS cluster 912b may provide the full snapshots to the primary DMS cluster 912a for deployment on the primary compute infrastructure 908a. Here, the secondary DMS cluster 912b may generate the snapshot if a secondary snapshot has been captured. For failure in the primary compute infrastructure 908a but not the primary DMS cluster 912a, the second DMS cluster 912b sends an incremental snapshot to the primary DMS cluster 912a to generate the snapshot. Because the primary DMS cluster 912a has retained the primary snapshots, only the incremental snapshots need to be sent. As such, the time to transition back to a protected state (from the secondary environment 902b to the primary environment 902a) is reduced. Furthermore, the amount of data transmitted between the environments 902a and 902b is reduced, thereby lowering network egress costs.

The virtual machines 924 of the secondary compute infrastructure 908b are shutdown 1040 to end execution of the application in the secondary compute infrastructure 908b. Here, the application has been migrated from the secondary environment 902b to the primary environment 902a to complete the failback.

The process 1000 may return to 1005, where the primary DMS cluster 912a continues to generate 1005 primary snapshots of virtual machines 904 executing the application in the primary compute infrastructure 908a. The process 1000 may be repeated. In some embodiments, the primary DMS cluster 912a or secondary DMS cluster 912b generates a user interface that allows a user to initiate configure and initiate the process 1000 for failover and/or failback between the primary environment and a secondary environment.

Although the process 1000 is discussed for performing a failover and failback for an application, the process 1000 may be performed to migrate an application between different computing environments, including different cloud computing environments. Furthermore, the process 1000 is discussed for migration of a set of virtual machines of an application, but may also be performed for other types of virtual machines.

Figure 11:
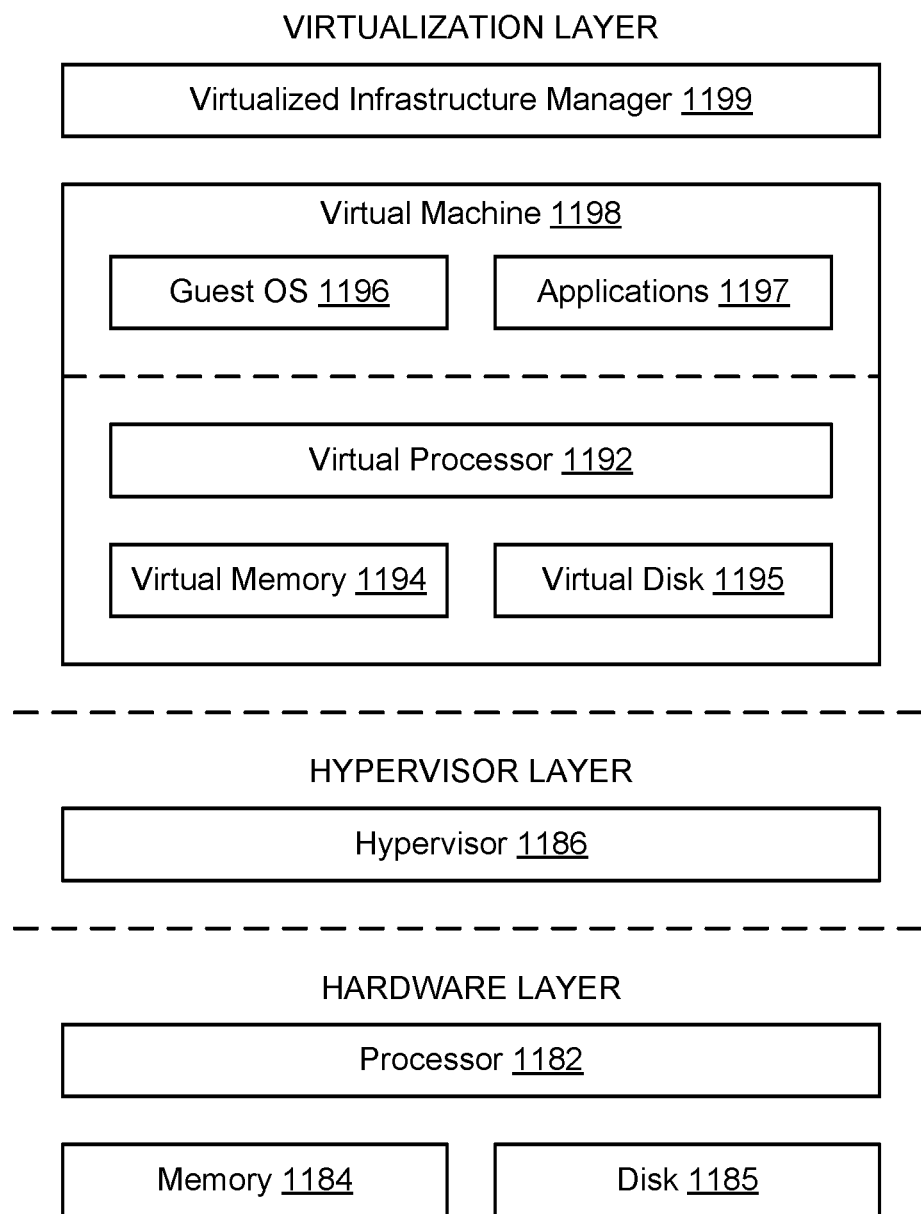
FIG. 11 is a block diagram of a virtual machine, according to one embodiment.

FIG. 11 is a block diagram of a server for a VM platform, according to one embodiment. The server includes hardware-level components and software-level components. The hardware-level components include one or more processors 1182, one or more memory 1184, and one or more storage devices 1185. The software-level components include a hypervisor 1186, a virtualized infrastructure manager 1199, and one or more virtual machines 1198. The hypervisor 1186 may be a native hypervisor or a hosted hypervisor. The hypervisor 1186 may provide a virtual operating platform for running one or more virtual machines 1198. Virtual machine 1198 includes a virtual processor 1192, a virtual memory 1194, and a virtual disk 1195. The virtual disk 1195 may comprise a file stored within the physical disks 1185. In one example, a virtual machine may include multiple virtual disks, with each virtual disk associated with a different file stored on the physical disks 1185. Virtual machine 1198 may include a guest operating system 1196 that runs one or more applications, such as application 1197. Different virtual machines may run different operating systems. The virtual machine 1198 may load and execute an operating system 1196 and applications 1197 from the virtual memory 1194. The operating system 1196 and applications 1197 used by the virtual machine 1198 may be stored using the virtual disk 1195. The virtual machine 1198 may be stored as a set of files including (a) a virtual disk file for storing the contents of a virtual disk and (b) a virtual machine configuration file for storing configuration settings for the virtual machine. The configuration settings may include the number of virtual processors 1192 (e.g., four virtual CPUs), the size of a virtual memory 1194, and the size of a virtual disk 1195 (e.g., a 10 GB virtual disk) for the virtual machine 1195.

The virtualized infrastructure manager 1199 may run on a virtual machine or natively on the server. The virtualized infrastructure manager 1199 corresponds to the virtualization module 106 above and may provide a centralized platform for managing a virtualized infrastructure that includes a plurality of virtual machines. The virtualized infrastructure manager 1199 may manage the provisioning of virtual machines running within the virtualized infrastructure and provide an interface to computing devices interacting with the virtualized infrastructure. The virtualized infrastructure manager 1199 may perform various virtualized infrastructure related tasks, such as cloning virtual machines, creating new virtual machines, monitoring the state of virtual machines, and facilitating backups of virtual machines.

Figure 12:
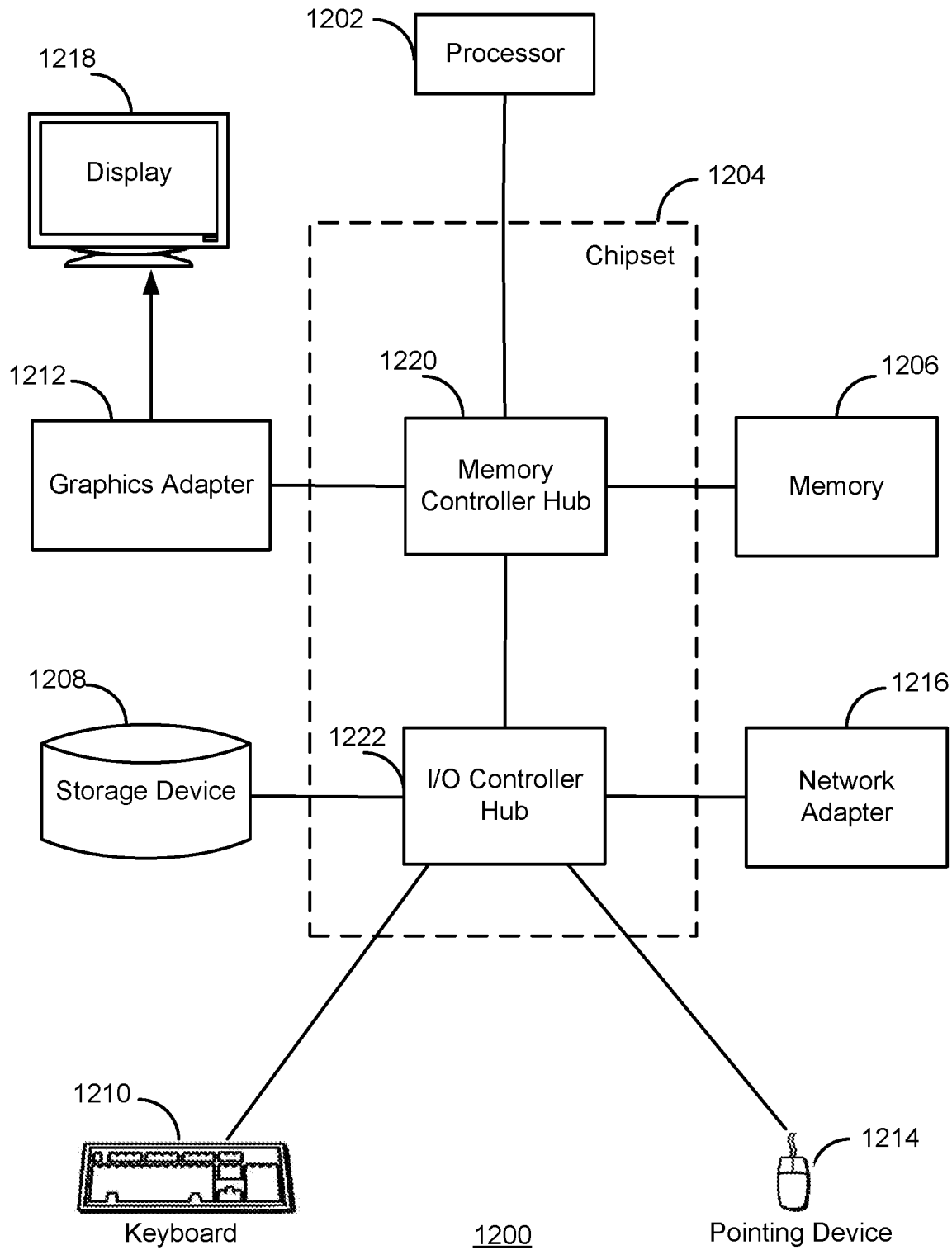
FIG. 12 is a block diagram of a computer system suitable for use in a DMS system, according to one embodiment.

FIG. 12 is a high-level block diagram illustrating an example of a computer system 1200 for use as one or more of the components shown above, according to one embodiment. Illustrated are at least one processor 1202 coupled to a chipset 1204. The chipset 1204 includes a memory controller hub 1220 and an input/output (I/O) controller hub 1222. A memory 1206 and a graphics adapter 1212 are coupled to the memory controller hub 1220, and a display device 1218 is coupled to the graphics adapter 1212. A storage device 1208, keyboard 1210, pointing device 1214, and network adapter 1216 are coupled to the I/O controller hub 1222. Other embodiments of the computer 1200 have different architectures. For example, the memory 1206 is directly coupled to the processor 1202 in some embodiments.

The storage device 1208 includes one or more non-transitory computer-readable storage media such as a hard drive, compact disk read-only memory (CD-ROM), DVD, or a solid-state memory device. The memory 1206 holds instructions and data used by the processor 1202. The pointing device 1214 is used in combination with the keyboard 1210 to input data into the computer system 1200. The graphics adapter 1212 displays images and other information on the display device 1218. In some embodiments, the display device 1218 includes a touch screen capability for receiving user input and selections. The network adapter 1216 couples the computer system 1200 to a network. Some embodiments of the computer 1200 have different and/or other components than those shown in FIG. 12. For example, the virtual machine 102, the physical machine 104, and/or the DMS node 110 in FIG. 1 can be formed of multiple blade servers and lack a display device, keyboard, and other components.

The computer 1200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 1208, loaded into the memory 1206, and executed by the processor 1202.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method for failover and fallback of an application between a primary compute infrastructure and a secondary compute infrastructure, comprising:
    generating primary snapshots of virtual machines of the application in the primary compute infrastructure according to a service level agreement defining a frequency for generating the primary snapshots, the primary snapshots being generated before the failover;
    transferring the primary snapshots to the secondary compute infrastructure for deployment as virtual machines in the secondary compute infrastructure;
    receiving secondary snapshots of the virtual machines of the application in the secondary compute infrastructure, the secondary snapshots being generated during the failover from the primary compute infrastructure to the secondary compute infrastructure at the frequency defined by the service level agreement, wherein a first data management and storage (DMS) cluster is coupled to the primary compute infrastructure to generate the primary snapshots and a second DMS cluster is coupled to the secondary compute infrastructure to generate the secondary snapshots, and wherein the service level agreement defining a frequency for generating the primary snapshots is shared by the first DMS cluster and the second DMS cluster; and
    to initiate the fallback from the secondary compute infrastructure to the primary compute infrastructure:
    constructing a current state of the application by combining the primary snapshots generated before the failover and the secondary snapshots generated during the failover; and
    deploying the application in the current state by deploying virtual machines on the primary compute infrastructure.

2. The method of claim 1, wherein:
    the primary snapshots are transferred to the secondary compute infrastructure in a form suitable for deployment as virtual machines in the secondary compute infrastructure;
    the secondary snapshots are received in a form suitable for deployment as virtual machines in the primary compute infrastructure; and
    the form suitable for deployment as virtual machines in the primary compute infrastructure is different from the form suitable for deployment as virtual machines in the secondary compute infrastructure.

3. The method of claim 2, wherein the form suitable for deployment as virtual machines in the primary compute infrastructure includes a native format for the primary compute infrastructure, and the form suitable for deployment as virtual machines in the secondary compute infrastructure includes a native format of the secondary compute infrastructure.

4. The method of claim 2, wherein the form suitable for deployment as virtual machines in the primary compute infrastructure includes a Virtual Machine Disk (VMDK) format and the form suitable for deployment as virtual machines in the secondary compute infrastructure includes an Amazon Machine Image (AMI) format.

5. The method of claim 2, further comprising converting the primary snapshots into the form suitable for deployment as virtual machines in the secondary compute infrastructure.

6. The method of claim 1, wherein the secondary compute infrastructure includes a cloud computing infrastructure.

7. The method of claim 1, wherein:
the first DMS cluster includes first peer DMS nodes and a first distributed data store implemented across the first peer DMS nodes;
the first distributed data store stores the primary snapshots and provides the primary snapshots to the secondary compute infrastructure;
the second DMS cluster includes second peer DMS nodes and a second distributed data store implemented across the second peer DMS nodes; and
the second distributed data store stores the secondary snapshots and provides the secondary snapshots to the primary compute infrastructure.

8. The method of claim 1, wherein a data management and storage (DMS) cluster is coupled to the primary compute infrastructure to generate the primary snapshots and the secondary compute infrastructure to generate the secondary snapshots.

9. The method of claim 1, wherein the primary snapshots are deployed on the secondary compute infrastructure during the failover from the primary compute infrastructure to the secondary compute infrastructure.

10. The method of claim 9, wherein failback is initiated responsive to resolution of a failure in the primary compute infrastructure that caused the failover and the fallback includes activating virtual machines of the application in the primary compute infrastructure according, to an application dependency, wherein the primary compute infrastructure includes at least one web server depending on at least one file server depending on at least one database server, and wherein the application dependency facilitates the at least one data base server being activated before the at least one file server being activated before the at least one web server.

11. The method of claim 1, wherein the primary compute infrastructure receives the secondary snapshots from the secondary compute infrastructure, and combines the primary and secondary snapshots.

12. The method of claim 1, wherein the secondary snapshots are generated in a native format of the secondary compute infrastructure and converted into a form suitable for deployment as virtual machines in the primary compute infrastructure.

13. The method of claim 1, wherein generating the primary snapshots of the virtual machines in the primary compute infrastructure includes:
associating the virtual machines with the application;
generating data fetch jobs for the virtual machines;
determining whether each of the data fetch jobs for the virtual machines is ready for execution; and
in response to determining that each of the data fetch jobs is ready for execution, executing the data fetch jobs by peer first data management and storage (DMS) nodes of a DMS cluster to generate the primary snapshots of the virtual machines.

14. The method of claim 13, further comprising, in response to determining that at least one of the data fetch jobs fails to be ready for execution, delaying execution of the data fetch jobs until each of the data fetch jobs is ready for execution.

15. The method of claim 1, wherein the virtual machines of the application include:
a database server for the application;
a file server for the application; and
a web server for the application.

16. The method of claim 1, wherein:
the primary snapshots of the virtual machines include a full image of a virtual machine; and
the secondary snapshots of the virtual machines include an incremental image of the virtual machine defining a difference between the virtual machine in the secondary compute infrastructure and the full image of the virtual machine.

17. A system for failover and failback of an application between a primary compute infrastructure and a secondary compute infrastructure, comprising:
a first data management and storage (DMS) cluster comprising peer DMS nodes that autonomously service the primary compute infrastructure, wherein each of the peer DMS nodes are configured to:
generating primary snapshots of virtual machines of the application in the primary compute infrastructure according to a service level agreement defining a frequency for generating the primary snapshots, the primary snapshots being generated before the failover; and
transfer the primary snapshots to a secondary compute infrastructure for deployment as virtual machines in the secondary compute infrastructure; and
the primary compute infrastructure; configured to:
receive secondary snapshots of the virtual machines of the application in the secondary compute infrastructure, the secondary snapshots being generated by a second DMS cluster coupled to the secondary compute infrastructure during the failover from the primary compute infrastructure to the secondary compute infrastructure at the frequency defined by the service level agreement, the service level agreement defining a frequency for generating the primary snapshots shared by the first DMS cluster and the second DMS cluster; and
to initiate the failback from the secondary compute infrastructure to the primary compute infrastructure:
construct a current state of the application by combining the primary snapshots generated before the failover and the secondary snapshots generated during the failover; and
deploy the application in the current state by deploying virtual machines on the primary compute infrastructure.

18. The system of claim 17, wherein:
the primary snapshots are transferred to the secondary compute infrastructure in a form suitable for deployment as virtual machines in the secondary compute infrastructure;
the secondary snapshots are received in a form suitable for deployment as virtual machines in the primary compute infrastructure; and
the form suitable for deployment as virtual machines in the primary compute infrastructure is different from the form suitable for deployment as virtual machines in the secondary compute infrastructure.

19. A non-transitory computer-readable medium comprising instructions that when executed by a processor configures the processor to:

generating primary snapshots of virtual machines of the application in the primary compute infrastructure according to a service level agreement defining a frequency for generating the primary snapshots, the primary snapshots being generated before a failover;

transfer the primary snapshots to a secondary compute infrastructure for deployment as virtual machines in the secondary compute infrastructure;

receive secondary snapshots of the virtual machines of the application in the secondary compute infrastructure, the secondary snapshots being generated during the failover from the primary compute infrastructure to the secondary compute infrastructure at the frequency defined by the service level agreement, wherein a first data management and storage (DMS) cluster is coupled to the primary compute infrastructure to generate the primary snapshots and a second DMS cluster is coupled to the secondary compute infrastructure to generate the secondary snapshots, and wherein the service level agreement defining a frequency for generating the primary snapshots is shared by the first DMS cluster and the second DMS cluster; and to initiate a failback from the secondary compute infrastructure to the primary compute infrastructure:

construct a current state of the application by combining the primary snapshots generated before the failover and the secondary snapshots generated during the failover; and deploy the application in the current state by deploying virtual machines on the primary compute infrastructure.

* * * * *

UNITED STATES PATENT AND TRADEMARK OFFICE
CERTIFICATE OF CORRECTION

PATENT NO. : 10,503,612 B1
APPLICATION NO. : 16/018013
DATED : December 10, 2019
INVENTOR(S) : Wang et al.

Page 1 of 2

It is certified that error appears in the above-identified patent and that said Letters Patent is hereby corrected as shown below:

On the Title Page

Item (22), in "Filed", in Column 1, Line 1, after "Jun. 25, 2018", insert --¶(65) Prior Publication Data US 2019/0391883 A1 Dec. 26, 2019--

In the Specification

In Column 4, Line 39, delete "108a-n" and insert --108a-k-- therefor

In Column 7, Line 46, delete "204j" and insert --204a-- therefor

In Column 7, Line 47, delete "206k" and insert --206a-- therefor

In Column 7, Line 63, delete "206x" and insert --206a-- therefor

In Column 17, Line 24, delete "902a" and insert --902b-- therefor

In Column 17, Line 52, delete "918a" and insert --196a-- therefor

In Column 18, Line 49, delete "918b" and insert --916b-- therefor

In Column 18, Line 50, delete "902b." and insert --912b.-- therefor

In Column 19, Line 50, delete "90b" and insert --902b-- therefor

In Column 19, Line 67, delete "908b" and insert --908a-- therefor

In Column 20, Line 5, delete "908b," and insert --908a,-- therefor

In Column 21, Line 13, delete "902b" and insert --912b-- therefor

Signed and Sealed this
Twenty-fifth Day of August, 2020

Andrei Iancu
*Director of the United States Patent and Trademark Office*

CERTIFICATE OF CORRECTION (continued)
U.S. Pat. No. 10,503,612 B1

In Column 21, Line 18, delete "902a" and insert --902b-- therefor

In Column 21, Line 59, delete "908b" and insert --908a-- therefor

In Column 23, Line 15, delete "1195." and insert --1198.-- therefor

In Column 23, Line 60, delete "102," and insert --104,-- therefor

In Column 23, Line 60, delete "104," and insert --108,-- therefor

In Column 23, Line 61, delete "110" and insert --114-- therefor

In the Claims

In Column 24, Line 15, in Claim 1, delete "fallback" and insert --failback-- therefor In Column 24, Line 40, in Claim 1, delete "fallback" and insert --failback-- therefor In Column 25, Line 36, in Claim 10, delete "fallback" and insert --failback-- therefor In Column 25, Line 38, in Claim 10, delete "according," and insert --according-- therefor In Column 26, Line 33, in Claim 17, delete "infrastructure;" and insert --infrastructure,-- therefor